US012395700B2

(12) United States Patent
Taylor et al.

(10) Patent No.: US 12,395,700 B2
(45) Date of Patent: Aug. 19, 2025

(54) ADAPTIVE MEDIA PLAYBACK EXPERIENCES FOR COMMERCIAL ENVIRONMENTS

(71) Applicant: Sonos, Inc., Santa Barbara, CA (US)

(72) Inventors: Ryan Taylor, Santa Barbara, CA (US); Andrew Kwatinetz, Seattle, WA (US); Benjamin Rappoport, Bainbridge Island, WA (US); Russell Dougherty, Seattle, WA (US); Dayn Wilberding, Portland, OR (US); Nicholas D'Amato, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/506,385

(22) Filed: Nov. 10, 2023

(65) Prior Publication Data

US 2024/0080522 A1    Mar. 7, 2024

Related U.S. Application Data

(63) Continuation of application No. 17/703,173, filed on Mar. 24, 2022, now Pat. No. 11,818,427.
(Continued)

(51) Int. Cl.
*H04N 21/44* (2011.01)
*H04N 21/43* (2011.01)
(Continued)

(52) U.S. Cl.
CPC ... *H04N 21/44222* (2013.01); *H04N 21/4307* (2013.01); *H04N 21/4394* (2013.01);
(Continued)

(58) Field of Classification Search
CPC ......... H04N 21/44222; H04N 21/4307; H04N 21/4394; H04N 21/4524; H04N 21/4532;
(Continued)

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Timothy R Newlin

(57) ABSTRACT

An example computing system may be configured to cause one or more playback devices located in a location of a commercial environment to play back an advertisement. The example computing system may also be configured to receive an indication that a user device is detected proximate to the location, during playback of the advertisement. The example computing system may also be configured to, after receiving the indication that the user device has been detected, receive an indication of a purchase of the subject of the advertisement, the purchase associated with the user profile. The example computing system may also be configured to, based on (i) the indication that the user device has been detected during play back of the advertisement and (ii) the indication of the purchase of the subject of the advertisement, cause a content service account associated with the computing system to be updated.

20 Claims, 13 Drawing Sheets

Related U.S. Application Data

(60) Provisional application No. 63/166,906, filed on Mar. 26, 2021.

(51) Int. Cl.
*H04N 21/439* (2011.01)
*H04N 21/442* (2011.01)
*H04N 21/45* (2011.01)
*H04N 21/81* (2011.01)
*H04R 27/00* (2006.01)

(52) U.S. Cl.
CPC ..... *H04N 21/4524* (2013.01); *H04N 21/4532* (2013.01); *H04N 21/812* (2013.01); *H04R 27/00* (2013.01); *H04R 2227/001* (2013.01); *H04R 2227/005* (2013.01); *H04R 2227/007* (2013.01); *H04R 2420/07* (2013.01)

(58) Field of Classification Search
CPC ........... H04N 21/812; H04N 21/43615; H04N 21/8113; H04R 27/00; H04R 2227/001; H04R 2227/005; H04R 2227/007; H04R 2420/07; H04R 1/406
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,937,725 | B1* | 5/2011 | Schaffer ............. H04N 21/4826 725/47 |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,767,510 | B2* | 9/2017 | Altberg ............. G06Q 30/0601 |
| 10,129,599 | B2* | 11/2018 | van der Heide ...... G06F 16/955 |
| 10,142,685 | B2* | 11/2018 | Arsenault ........ H04N 21/44218 |
| 2001/0013016 | A1* | 8/2001 | Hunter ............. H04N 7/17318 348/E7.071 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0102993 | A1* | 8/2002 | Hendrey ............. G06Q 30/0273 455/457 |
| 2002/0124097 | A1 | 9/2002 | Isely et al. |
| 2003/0103644 | A1* | 6/2003 | Klayh ............. H04N 21/44016 348/E7.063 |
| 2003/0157951 | A1 | 8/2003 | Hasty, Jr. |
| 2004/0024478 | A1 | 2/2004 | Hans et al. |
| 2004/0148555 | A1* | 7/2004 | Blackburn ............ H04N 21/812 348/E5.005 |
| 2007/0142944 | A1 | 6/2007 | Goldberg et al. |
| 2008/0139181 | A1* | 6/2008 | Lokshin ................ H04W 4/029 455/414.1 |
| 2009/0012847 | A1* | 1/2009 | Brooks .................. G06Q 30/02 705/7.29 |
| 2009/0204479 | A1* | 8/2009 | Wolinsky ........... G06Q 30/0259 705/14.57 |
| 2009/0328087 | A1* | 12/2009 | Higgins ............. H04N 21/4524 725/115 |
| 2011/0161136 | A1* | 6/2011 | Faith ................... H04L 63/0861 705/14.1 |
| 2012/0245995 | A1* | 9/2012 | Chawla ................. G06Q 30/02 705/16 |
| 2014/0189764 | A1* | 7/2014 | Ullman ................ H04N 21/251 725/109 |
| 2015/0205573 | A1* | 7/2015 | Kaplan .................. G06Q 50/10 700/94 |
| 2016/0197967 | A1* | 7/2016 | Kreifeldt ............... G06F 16/637 709/204 |
| 2019/0289422 | A1* | 9/2019 | Kao ........................ H04W 4/02 |
| 2020/0311119 | A1* | 10/2020 | Rönnäng .............. G06F 3/0482 |
| 2021/0233110 | A1* | 7/2021 | Ye ....................... G06Q 30/0255 |
| 2021/0250641 | A1* | 8/2021 | Aguiar ............... H04N 21/4223 |
| 2022/0108338 | A1* | 4/2022 | Pham .................. G06Q 30/0205 |
| 2023/0206952 | A1* | 6/2023 | Chen, IV ................ H04L 65/60 700/94 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc. v. D&M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

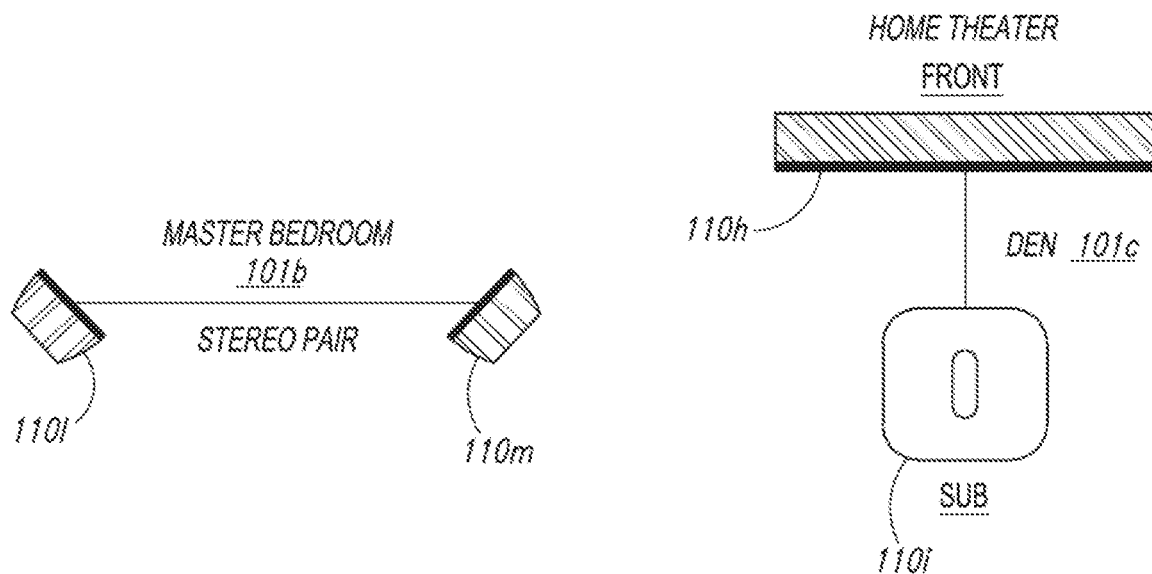
Figure 1J
Figure 1K
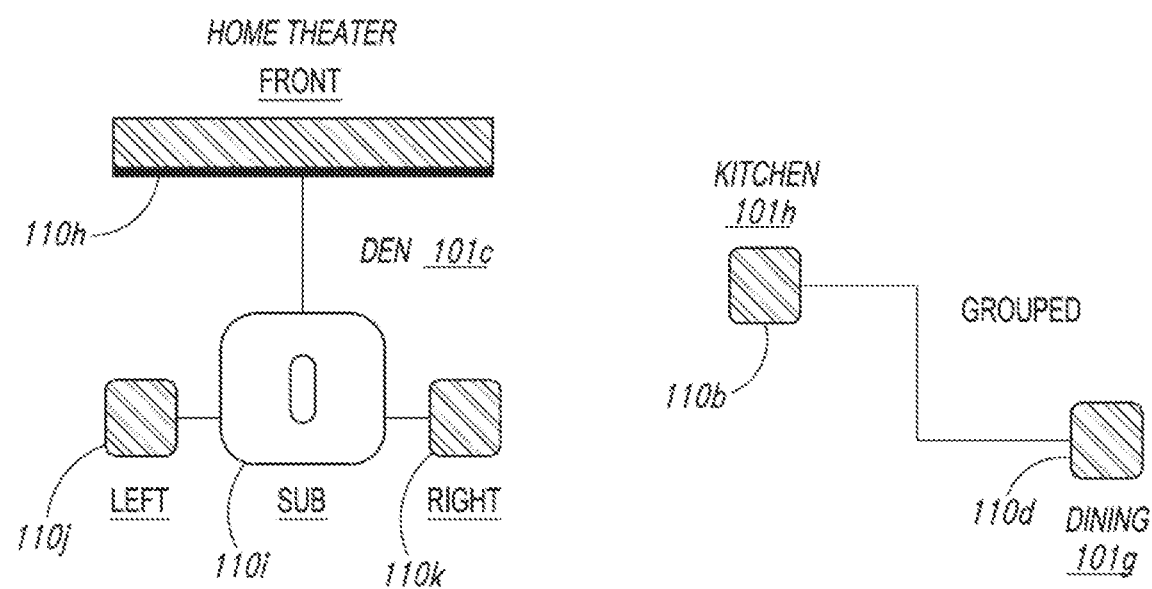
Figure 1L
Figure 1M

ADAPTIVE MEDIA PLAYBACK EXPERIENCES FOR COMMERCIAL ENVIRONMENTS

CROSS-REFERENCE TO RELATED APPLICATIONS

This application claims the benefit of priority under 35 U.S.C. § 120 to U.S. application Ser. No. 17/703,173 filed on Mar. 24, 2022, entitled "Adaptive Media Playback Experiences for Commercial Environments," which claims the benefit of priority under 35 U.S.C. § 119 to U.S. Provisional Patent App. No. 63/166,906, filed on Mar. 26, 2021, the content of each of which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when Sonos, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIGS. 1J through 1M are schematic diagrams of example corresponding media playback system zones.

Figure 1A:
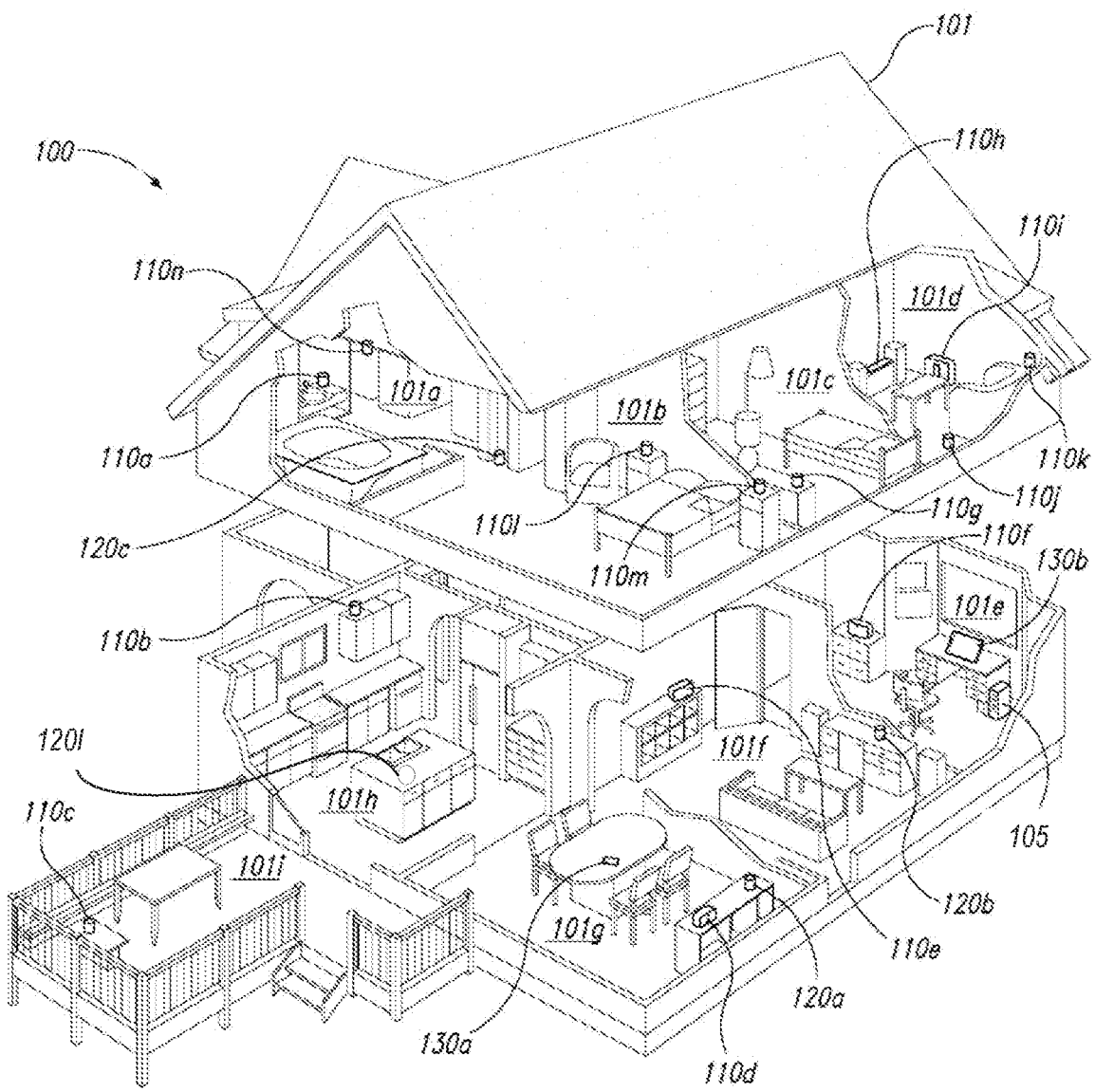
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to enhanced experiences surrounding the playback of media content by a media playback system located within a commercial environment.

Currently, solutions that allow a business to provide highly tailored audio content in a commercial environment, including the ability to analyze the effectiveness of such content, are limited. For example, a business that chooses to play back audio content in a commercial environment may manually select the audio content based on a particular customer demographic that is expected to be present in the commercial environment. However, in some cases the business might make this selection without any market research or customer input that might inform the selection. In addition, a business may have no way to track how many customers experienced the audio content, if any, or whether they liked it or disliked it. Similarly, if advertisements are included as part of the media content, the business may have relatively little visibility into the effectiveness of the advertisements without correlating information regarding how many customers heard the advertisements and later made corresponding purchases. Further, if the business elects to play back content provided by a content provider, the business may have little or no input on the advertisements that may be inserted into the media content.

Accordingly, embodiments described herein relate to techniques for providing enhanced experiences around the selection and playback of media content in a commercial environment. For example, a media content provider, such as Sonos, Inc. ("Sonos"), may provide internet radio programming including media content that may be curated based on specific preferences and rules established by the business, as well as real-time information (e.g., inventory information) that is available to the media service provider through integration with the business's systems.

Further, the media content provider may facilitate a media playback system that encompasses the commercial environment and may provide various benefits. For instance, in addition to playback devices arranged in a multi-zone configuration, the media playback system may include one or more sensors that may provide an indication of customer presence within the commercial environment. In some cases, customer presence may be determined based on the detection of a user device (e.g., smartphone) that is installed with a retail application for the particular business, in which the user has opted-in for location-enhanced experiences. In this way, a business may have improved control over the media content that is played back in the commercial environment, including the ability to, for example, select targeted advertisements for playback based on numerous different inputs that may be available to the media content provider (e.g., current inventory information, customer foot traffic, etc.). As another example, the retail application may display a "Now Playing" screen that provides information about the media content currently playing in the commercial environment and may further allow the customer to indicate whether they like or dislike this content. This may allow the business to further refine their media content selection criteria.

In situations where customer presence may be determined based on the detection of a user device, it may be possible to localize the user device within the commercial environment to provide more granular benefits. For example, the retail application may maintain a log of the advertisement that the customer heard, or likely heard, based on the location of the user device in the commercial environment over time. This information may be correlated with purchases the customer made, which may also be recorded in the retail application, in order to evaluate the efficacy of the advertisements. Various other benefits are also possible and will be discussed in further detail below.

In addition, a given customer in the commercial environment may have their own household media playback system that is facilitated by the same media service provider (e.g., Sonos). Thus, the customer may have a media playback system account and associated user profile that is populated with a robust record of the customer's music preferences and listening history. In some cases, the customer's user device discussed above may be additionally installed with a controller application for the user's home media playback system. While it might be useful to apply some of this information to other media playback systems, convenient ways to accomplish this are currently limited. For example, although the user device may be installed with a controller application for a home media playback system facilitated by the same media content provider as the commercial media playback system, the user device generally does not connect to the local area network on which the commercial media playback system is operating. As such, the media content provider may have no way to identify the user device as such.

Accordingly, embodiments are described below in which a customer may link their media playback system user account with a user account associated with the business operating in the commercial environment. In this way, the customer's music preferences may be shared with the retail application (and possibly one or more remote computing devices associated with the business). This information may then be passed to the media content provider and used to select media content for playback in the commercial environment that is targeted to individual customers. Advantageously, the information that a user may opt-in to share in order to obtain these benefits may be limited to the user's musical preferences and other non-personally identifying information. Further, the linking of user accounts noted above may unlock additional benefits for the customer, such as the ability to flag songs or advertisements heard in the commercial environment for later playback by the customer's home media playback system. Numerous other benefits and advantages are also possible.

As discussed in further detail below, the techniques discussed herein may be flexibly and intelligently applied based on information related to the business that is operating in the commercial environment as well as the preferences of individual customers that may be detected within the commercial environment at a given time. In some embodiments, for example, a computing system is provided including at least one processor, a non-transitory computer-readable medium, and program instructions stored on the non-transitory computer-readable medium that are executable by the at least one processor such that the computing system is configured to (i) receive an indication that a user device has been detected in a commercial environment; (ii) determine a first set of musical preferences associated with the commercial environment; (iii) determine a user profile associated with the user device; (iv) determine a second set of musical preferences associated with the user profile; (v) based on at least (a) the first set of musical preferences associated with the commercial environment, and (b) the second set of musical preferences associated with the user profile, determine one or more media items for playback; and (vi) cause one or more playback devices in the commercial environment to play back the one or more media items.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

II. Suitable Operating Environment a. Suitable Media Playback System

Figure 1B:
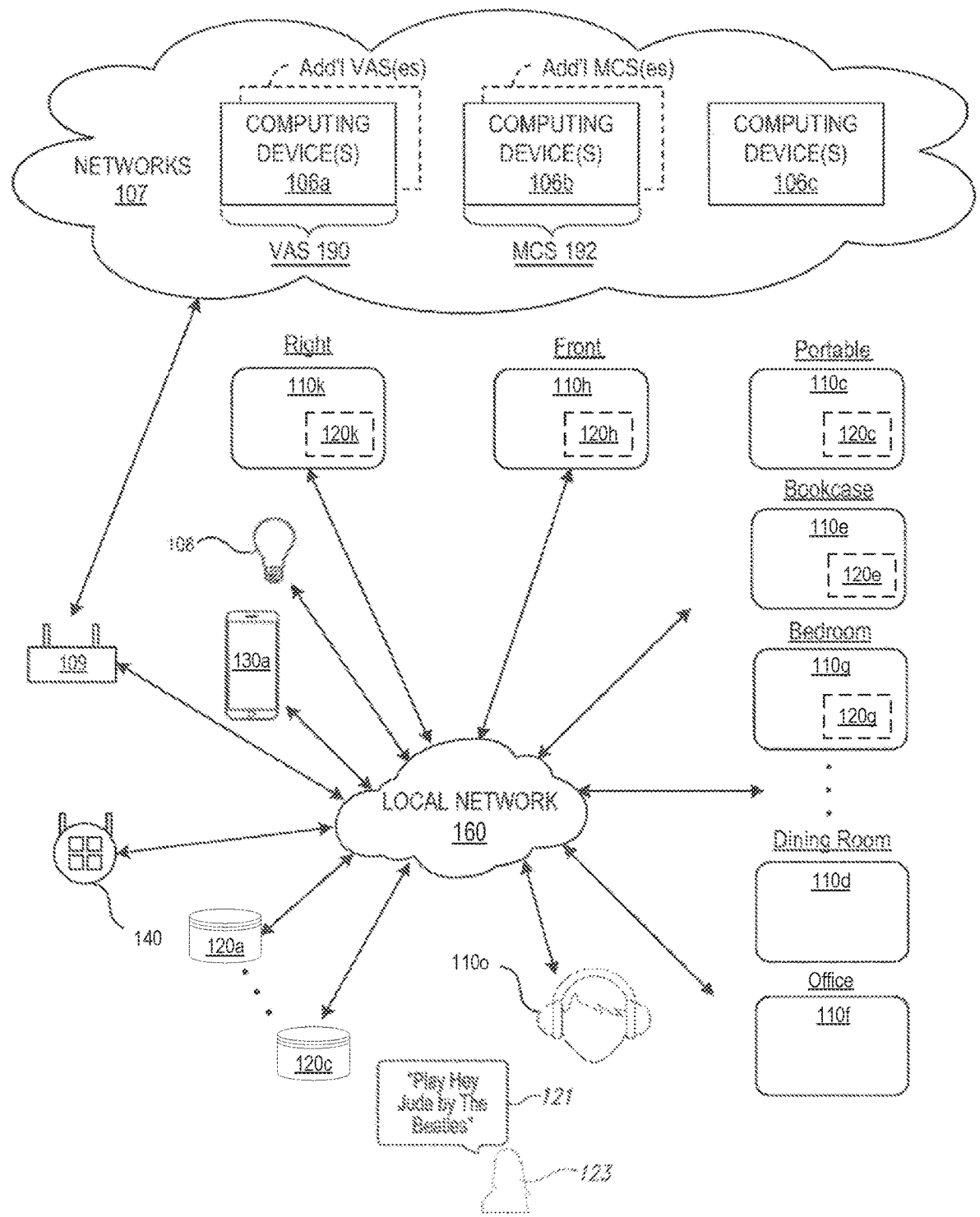
FIG. 1B is a schematic diagram of the media playback system of FIG. 1A and one or more networks.

FIGS. 1A and 1B illustrate an example configuration of a media playback system ("MPS") 100 in which one or more embodiments disclosed herein may be implemented. Referring first to FIG. 1A, a partial cutaway view of MPS 100 distributed in an environment 101 (e.g., a house) is shown. The MPS 100 as shown is associated with an example home environment having a plurality of rooms and spaces, although other types of environments (e.g., a commercial environment) are also possible, as discussed in further examples below. The MPS 100 comprises one or more playback devices 110 (identified individually as playback devices 110*a-o*), one or more network microphone devices ("NMDs") 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the MPS 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the MPS 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the MPS 100 is configured to play back audio from a first playback device (e.g., the playback device 110a) in synchrony with a second playback device (e.g., the playback device 110b). Interactions between the playback devices 110, NMDs 120, and/or control devices 130 of the MPS 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), as described in further detail below with respect to FIGS. 5A-5B. In further embodiments, the MPS 100 may be implemented in one or more vehicles (e.g., a sports utility vehicle, bus, car, a ship, a boat, an airplane), multiple environments (e.g., a combination of home, commercial, and vehicle environments), and/or another suitable environment where multi-zone audio may be desirable.

The MPS 100 can comprise one or more playback zones, some of which may correspond to the rooms in the environment 101. The MPS 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices.

Referring to FIG. 1B, the home environment may include additional and/or other computing devices, including local network devices, such as one or more smart illumination devices 108 (FIG. 1B), a smart thermostat 140, and a local computing device 105 (FIG. 1A). In embodiments described below, one or more of the various playback devices 110 may be configured as portable playback devices, while others may be configured as stationary playback devices. For example, the headphones 110o (FIG. 1B) are a portable playback device, while the playback device 110e on the bookcase may be a stationary device. As another example, the playback device 110c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices and/or other network devices of the MPS 100 may be coupled to one another via point-to-point connections and/or over other connections, which may be wired and/or wireless, via a local network 160 that may include a network router 109. For example, the playback device 110j in the Den 101d (FIG. 1A), which may be designated as the "Left" device, may have a point-to-point connection with the playback device 110k, which is also in the Den 101d and may be designated as the "Right" device. In a related embodiment, the Left playback device 110j may communicate with other network devices, such as the playback device 110h, which may be designated as the "Front" device, via a point-to-point connection and/or other connections via the local network 160.

The local network 160 may be, for example, a network that interconnects one or more devices within a limited area (e.g., a residence, an office building, a restaurant, a retail store, a car, an individual's workspace, etc.). The local network 160 may include, for example, one or more local area networks (LANs) such as a wireless local area network (WLAN) (e.g., a Wi-Fi network, a Z-Wave network, etc.)

and/or one or more personal area networks (PANs) (e.g. a Bluetooth network, a wireless USB network, a ZigBee network, an IRDA network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "Wi-Fi" can refer to several different communication protocols including, for example, Institute of Electrical and Electronics Engineers (IEEE) 802.11a, 802.11b, 802.11g, 802.12, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

The MPS 100 is configured to receive media content from the local network 160. The received media content can comprise, for example, a Uniform Resource Identifier (URI) and/or a Uniform Resource Locator (URL). For instance, in some examples, the MPS 100 can stream, download, or otherwise obtain data from a URI or a URL corresponding to the received media content.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the environment 101 (FIG. 1A).

In some implementations, the various playback devices 110, NMDs 120, and/or control devices 130 may be communicatively coupled to at least one remote computing device associated with a voice assistant service ("VAS") and/or at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some embodiments, the various playback devices 110, NMDs 120, and/or control devices 130 may transmit data associated with a received voice input to a VAS configured to (i) process the received voice input data and (ii) transmit a corresponding command to the MPS 100. In some aspects, for example, the computing devices 106a may comprise one or more modules and/or servers of a VAS. In some implementations, VASes may be operated by one or more of SONOS, AMAZON, GOOGLE, APPLE, MICROSOFT, NUANCE, or other voice assistant providers. In some implementations, MCSes may be operated by one or more of SONOS, SPOTIFY, PANDORA, AMAZON MUSIC, YOUTUBE MUSIC, APPLE MUSIC, or other media content services.

In some embodiments, the local network 160 comprises a dedicated communication network that the MPS 100 uses to transmit messages between individual devices and/or to transmit media content to and from MCSes. In certain embodiments, the local network 160 is configured to be accessible only to devices in the MPS 100, thereby reducing interference and competition with other devices in the environment 101. In other embodiments, however, the local network 160 comprises an existing household communication network (e.g., a household Wi-Fi network). In some embodiments, the MPS 100 is implemented without the local network 160, and the various devices comprising the MPS 100 can communicate with each other, for example, via one or more direct connections, PANs, telecommunication networks (e,g., an LTE network or a 5G network, etc.), and/or other suitable communication links.

In some embodiments, audio content sources may be regularly added or removed from the MPS 100. In some embodiments, for example, the MPS 100 performs an indexing of media items when one or more media content sources are updated, added to, and/or removed from the MPS 100. The MPS 100 can scan identifiable media items in some or all folders and/or directories accessible to the various playback devices and generate or update a media content database comprising metadata (e.g., title, artist, album, track length) and other associated information (e.g., URIs, URLs) for each identifiable media item found. In some embodiments, for example, the media content database is stored on one or more of the various playback devices, network microphone devices, and/or control devices of MPS 100.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 110 may take the form of or include an on-board (e.g., integrated) network microphone device configured to receive voice utterances from a user. For example, the playback devices 110c-110h, and 110k include or are otherwise equipped with corresponding NMDs 120c-120h, and 120k, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMD 120l may be a stand-alone device. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110e because it is physically situated on a bookcase. Similarly, the NMD 120l may be assigned the named "Island" because it is physically situated on an island countertop in the Kitchen 101h (FIG. 1A). Some playback devices may be assigned names according to a zone or room, such as the playback devices 110g, 110d, and 110f, which are named "Bedroom," "Dining Room," and "Office," respectively. Further, certain playback devices may have functionally descriptive names. For example, the playback devices 110k and 110h are assigned the names "Right" and "Front," respectively, because these two devices are configured to provide specific audio channels during media playback in the zone of the Den 101d (FIG. 1A). The playback device 110c in the Patio may be named "Portable" because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 120 are configured to interact with the VAS 190 over the local network 160 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 105, 110, 120, and 130 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. Patent Publication No. 2017-0242653 published Aug. 24, 2017, and titled "Voice Control of a Media Playback System," which is herein incorporated by reference in its entirety.

Upon receiving the stream of sound data, the VAS 190 may determine if there is voice input in the streamed data from the NMD, and if so the VAS 190 may also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the NIPS 100 or indirectly via the VAS 190. In some implementations, the VAS 190 may transmit to the NIPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 110e in the environment 101 (FIG. 1A) is in relatively close proximity to the NMD-equipped Living Room playback device 120b, and both devices 110e and 120b may at least sometimes detect the same sound. In such cases, this may require arbitration as to which device is ultimately responsible for providing detected-sound data to the remote VAS. Examples of arbitrating between NMDs may be found, for example, in previously referenced U.S. Patent Publication No. 2017-0242653.

In certain implementations, an NMD may be assigned to, or otherwise associated with, a designated or default playback device that may not include an NMD. For example, the Island NMD 120l in the Kitchen 101h (FIG. 1A) may be assigned to the Dining Room playback device 110d, which is in relatively close proximity to the Island NMD 120l. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Publication No. 2017-0242653.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback devices 110, network microphone devices 120, and/or control devices 130. For example, the technologies herein may be utilized within an environment having a single playback device 110 and/or a single NMD 120. In some examples of such cases, the local network 160 (FIG. 1B) may be eliminated and the single playback device 110 and/or the single NMD 120 may communicate directly with the remote computing devices 106a-c. In some embodiments, a telecommunication network (e.g., an LTE network, a 5G network, etc.) may communicate with the various playback devices 110, network microphone devices 120, and/or control devices 130 independent of the local network 160.

b. Suitable Playback Devices

Figure 1C:
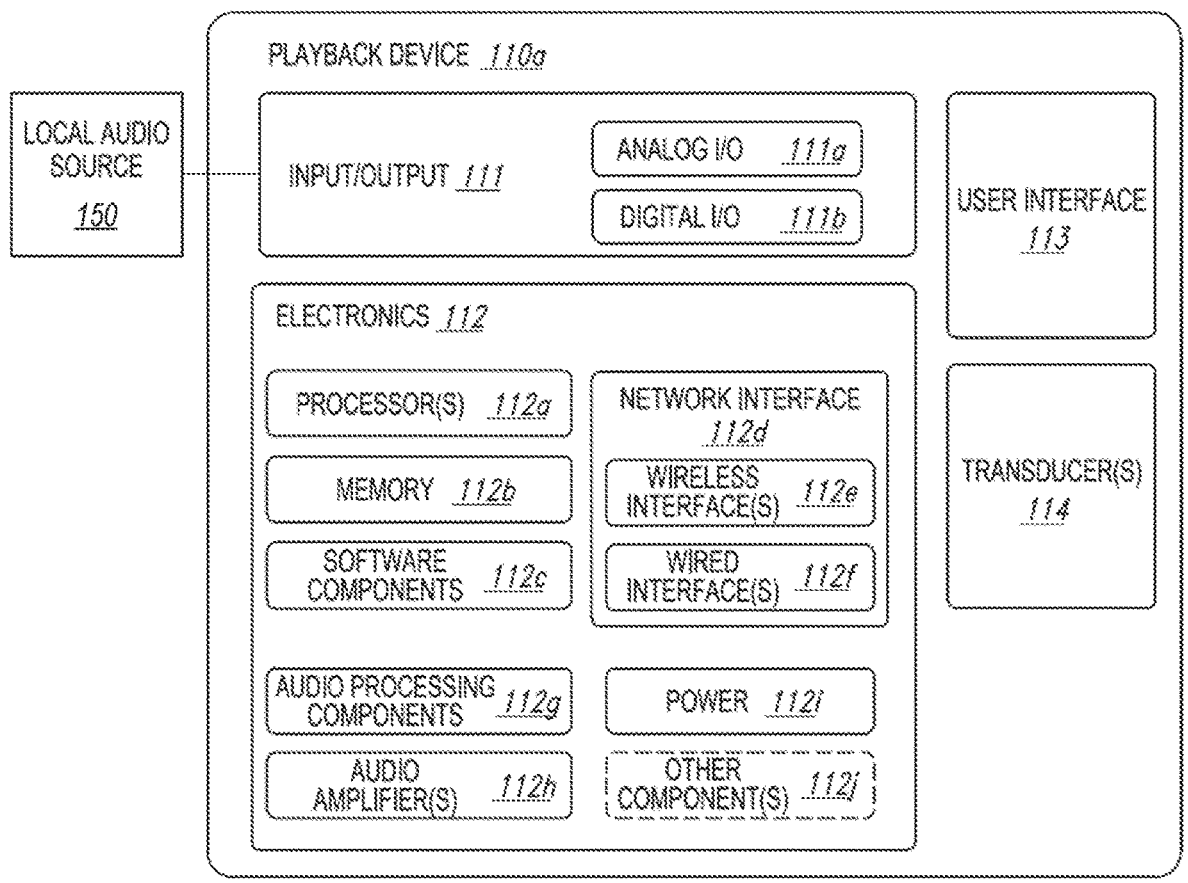
FIG. 1C is a block diagram of an example playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, Wi-Fi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 150 via the input/output 111 (e.g., a cable, a wire, a PAN, a Bluetooth connection, an ad hoc wired or wireless communication network, and/or another suitable communication link). The local audio source 150 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 150 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 150. In other embodiments, however, the media playback system omits the local audio source 150 altogether. In some embodiments, the playback device 110a does not include an input/output 111 and receives all audio content via the local network 160.

The playback device 110a further comprises electronics 112, a user interface 113 (e.g., one or more buttons, knobs, dials, touch-sensitive surfaces, displays, touchscreens), and one or more transducers 114 (e.g., a driver), referred to hereinafter as "the transducers 114." The electronics 112 is configured to receive audio from an audio source (e.g., the local audio source 150) via the input/output 111, one or more of the computing devices 106a-c via the local network 160 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power components 112i (e.g., one or more power supplies, power cables, power receptacles, batteries, induction coils, Power-over Ethernet (POE) interfaces, and/or other suitable sources of electric power).

In some embodiments, the electronics 112 optionally include one or more other components 112j (e.g., one or more sensors, video displays, touchscreens, battery charging bases). In some embodiments, the playback device 110a and electronics 112 may further include one or more voice processing components that are operable coupled to one or more microphones, and other components as described below with reference to FIGS. 1F and 1G.

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395 entitled "System and Method for Synchronizing Operations Among a Plurality of Independently Clocked Digital Data Processing Devices," which is incorporated by reference herein in its entirety.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the MPS 100. In some aspects, for example, the state data is shared during predetermined intervals of time (e.g., every 5 seconds, every 10 seconds, every 60 seconds) among at least a portion of the devices of the MPS 100, so that one or more of the devices have the most recent data associated with the MPS 100.

The network interface 112d is configured to facilitate a transmission of data between the playback device 110a and one or more other devices on a data network. The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the local network 160 (FIG. 1B) in accordance with a suitable wireless communication protocol (e.g., Wi-Fi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

In some implementations, the power components 112*i* of the playback device 110*a* may additionally include an internal power source (e.g., one or more batteries) configured to power the playback device 110*a* without a physical connection to an external power source. When equipped with the internal power source, the playback device 110*a* may operate independent of an external power source. In some such implementations, an external power source interface may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The user interface 113 may facilitate user interactions independent of or in conjunction with user interactions facilitated by one or more of the control devices 130 (FIG. 1A). In various embodiments, the user interface 113 includes one or more physical buttons and/or supports graphical interfaces provided on touch sensitive screen(s) and/or surface(s), among other possibilities, for a user to directly provide input. The user interface 113 may further include one or more of lights (e.g., LEDs) and the speakers to provide visual and/or audio feedback to a user.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

In some embodiments, the playback device 110*a* may include a speaker interface for connecting the playback device to external speakers. In other embodiments, the playback device 110*a* may include an audio interface for connecting the playback device to an external audio amplifier or audio-visual receiver.

Figure 1D:
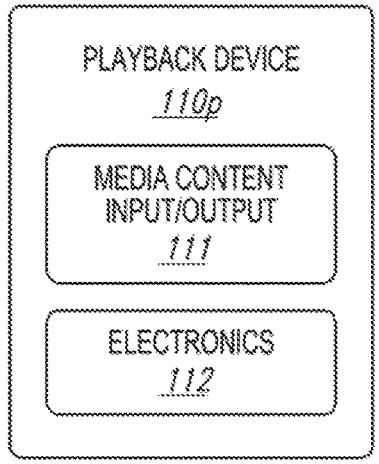
FIG. 1D is a block diagram of an example playback device.

By way of illustration, SONOS, Inc. presently offers (or has offered) for sale certain playback devices including, for example, "SONOS ONE," "SONOS ONE SL," "SONOS FIVE," "PLAY:1," "PLAY:3," "PLAY:5," "PLAYBAR," "PLAYBASE," "BEAM," "ARC," "CONNECT:AMP," "CONNECT," "AMP," "PORT," "MOVE," and "SUB," as well as network devices including, for example "BOOST," and "BRIDGE." Other suitable playback devices may additionally or alternatively be used to implement the playback devices of example embodiments disclosed herein. Additionally, one of ordinary skill in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
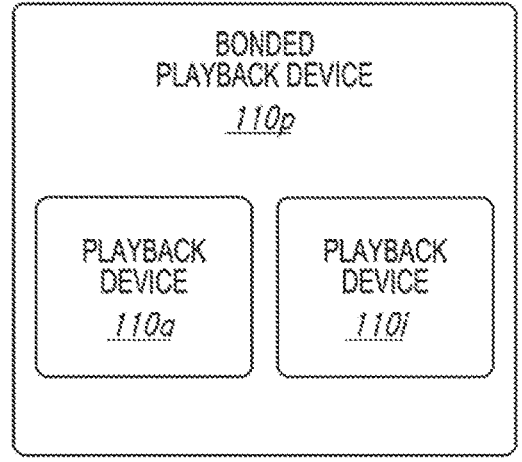
FIG. 1E is a block diagram of an example playback device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with playback device 110*i*, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

Figure 4:
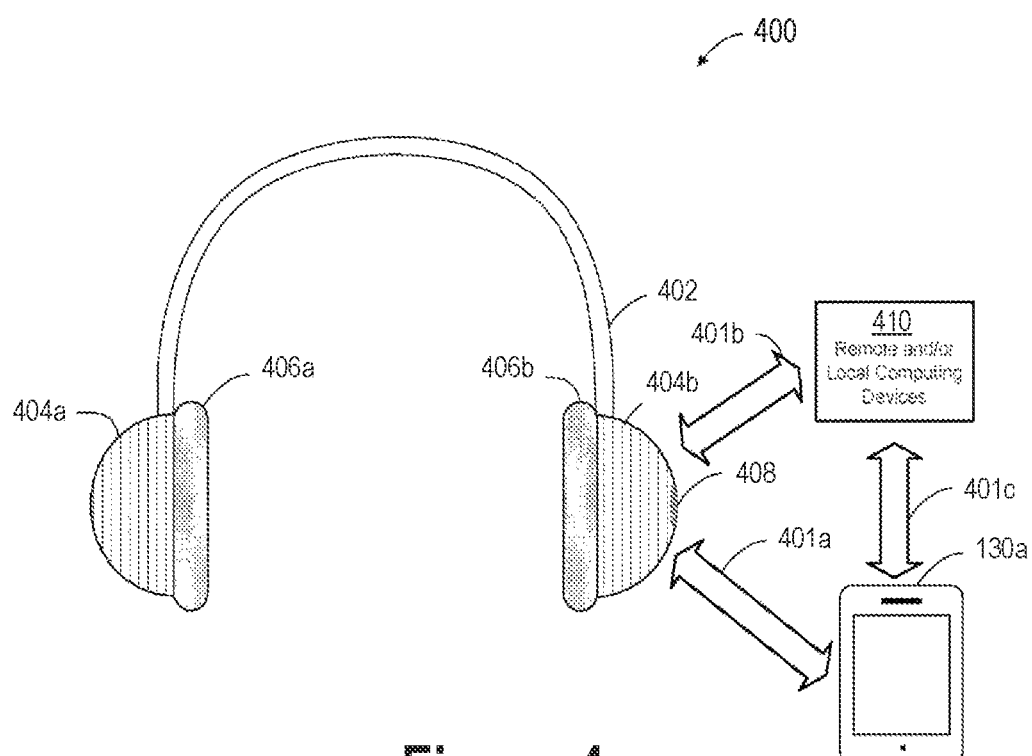
FIG. 4 is a diagram of an example headset assembly for the playback device of FIG. 3.

In some embodiments, one or more of the playback devices 110 may take the form of a wired and/or wireless headphone (e.g., an over-ear headset, an on-ear headset, or an in-ear headset). For instance, FIG. 4 shows an example headset assembly 400 ("headset 400") for such an implementation of one of the playback devices 110. As shown, the headset 400 includes a headband 402 that couples a first earcup 404*a* to a second earcup 404*b*. Each of the earcups 404*a* and 0244*b* may house any portion of the electronic components in the playback device 110, such as one or more speakers. Further, one or more of the earcups 404*a* and 404*b* may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406*a* and 406*b* that are coupled to ear cups 404*a* and 404*b*, respectively. The ear cushions 406*a* and 406*b* may provide a soft barrier between the head of a user and the earcups 404*a* and 404*b*, respectively, to improve user comfort and/or provide acoustic isolation from the ambient (e.g., passive noise reduction (PNR)).

As described in greater detail below, the electronic components of a playback device may include one or more network interface components (not shown in FIG. 4) to facilitate wireless communication over one more communication links. For instance, a playback device may communicate over a first communication link 401*a* (e.g., a Bluetooth link) with one of the control devices 130 and/or over a second communication link 401*b* (e.g., a Wi-Fi or cellular link) with one or more other computing devices 410 (e.g., a network router and/or a remote server). As another possibility, a playback device may communicate over multiple communication links, such as the first communication link 401*a* with the control device 130*a* and a third communication link 401*c* (e.g., a Wi-Fi or cellular link) between the control device 130*a* and the one or more other computing devices 410. Thus, the control device 130*a* may function as an intermediary between the playback device and the one or more other computing devices 410, in some embodiments.

In some instances, the headphone device may take the form of a hearable device. Hearable devices may include those headphone devices (including ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.).

It should be appreciated that one or more of the playback devices 110 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback devices 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

c. Suitable Network Microphone Devices (NMD)s

Figure 1F:
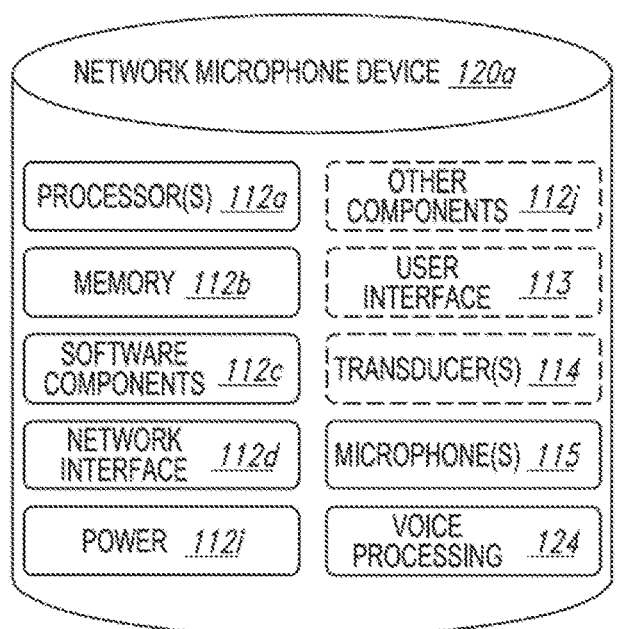
FIG. 1F is a block diagram of an example network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the transducers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing components 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

Figure 1G:
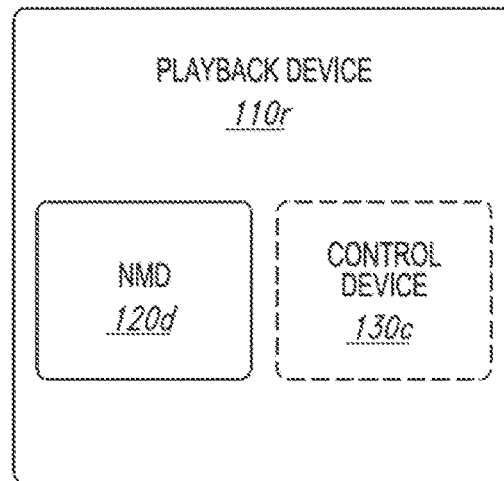
FIG. 1G is a block diagram of an example playback device.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The microphones 115 are configured to detect sound (i.e., acoustic waves) in the environment of the playback device 110*r*, which is then provided to voice processing components 124. More specifically, each microphone 115 is configured to detect sound and convert the sound into a digital or analog signal representative of the detected sound, which can then cause the voice processing component to perform various functions based on the detected sound, as described in greater detail below. In some implementations, the microphones 115 may be arranged as an array of microphones (e.g., an array of six microphones). In some implementations the playback device 110r may include fewer than six microphones or more than six microphones. The playback device 110r optionally includes an integrated control device 130c. The control device 130c can comprise, for example, a user interface configured to receive user input (e.g., touch input, voice input) without a separate control device. In other embodiments, however, the playback device 110r receives commands from another control device (e.g., the control device 130a of FIG. 1B).

In operation, the voice-processing components 124 are generally configured to detect and process sound received via the microphones 115, identify potential voice input in the detected sound, and extract detected-sound data to enable a VAS, such as the VAS 190 (FIG. 1B), to process voice input identified in the detected-sound data. The voice processing components 124 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 124 may include or otherwise take the form of one or more DSPs or one or more modules of a DSP. In this respect, certain voice processing components 124 may be configured with particular parameters (e.g., gain and/or spectral parameters) that may be modified or otherwise tuned to achieve particular functions. In some implementations, one or more of the voice processing components 124 may be a subcomponent of the processor 112a.

In some implementations, the voice-processing components 124 may detect and store a user's voice profile, which may be associated with a user account of the MPS 100. For example, voice profiles may be stored as and/or compared to variables stored in a set of command information or data table. The voice profile may include aspects of the tone of frequency of a user's voice and/or other unique aspects of the user's voice, such as those described in previously-referenced U.S. Patent Publication No. 2017-0242653.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing components 124 receive and analyze the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Controller Devices

Figure 1H:
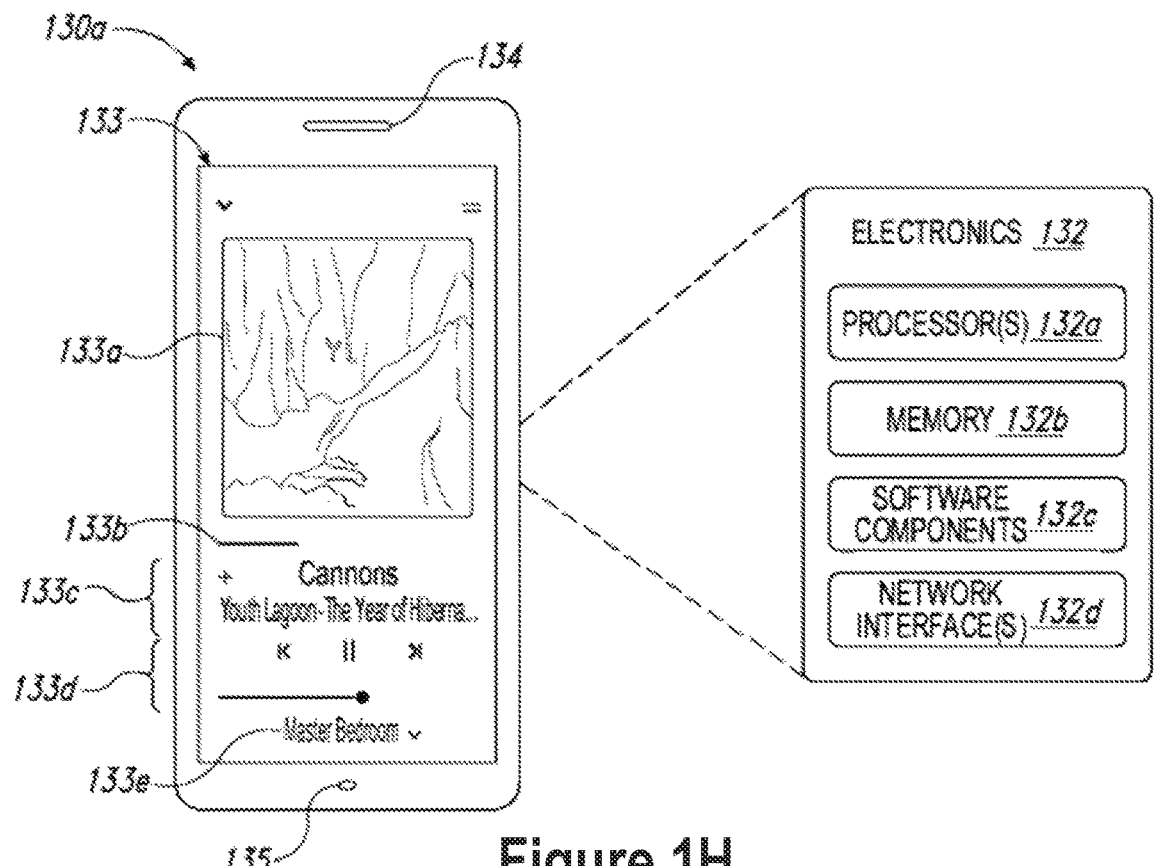
FIG. 1H is a partially schematic diagram of an example control device.

FIG. 1H is a partially schematic diagram of one of the control device 130a (FIGS. 1A and 1B). As used herein, the term "control device" can be used interchangeably with "controller," "control device," or "control system." Among other features, the control device 130a is configured to receive user input related to the MPS 100 and, in response, cause one or more devices in the MPS 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the MPS 100, which may take the form of a software application (e.g., a controller application) that is specific to the particular playback environment in which the MPS 100 is located. For instance, a controller application designed for use with a media playback system in a commercial environment may comprise a different set of dashboards, menus, and other types of information than a controller application that is designed for use with a household media playback system, such as the media playback system shown in FIG. 1A. In other embodiments, as described above with respect to FIG. 1G, the control device 130a is integrated into another device in the MPS 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the MPS 100. The memory 132b can comprise data storage that can be loaded with one or more of the software components executable by the processor 302 to perform those functions. The software components 132c can comprise applications and/or other executable software configured to facilitate control of the MPS 100. The memory 112b can be configured to store, for example, the software components 132c, media playback system controller application software, and/or other data associated with the MPS 100 and the user.

The network interface 132d is configured to facilitate network communications between the control device 130a and one or more other devices in the MPS 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.12, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130a to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1J through 2.

Figure 1I:
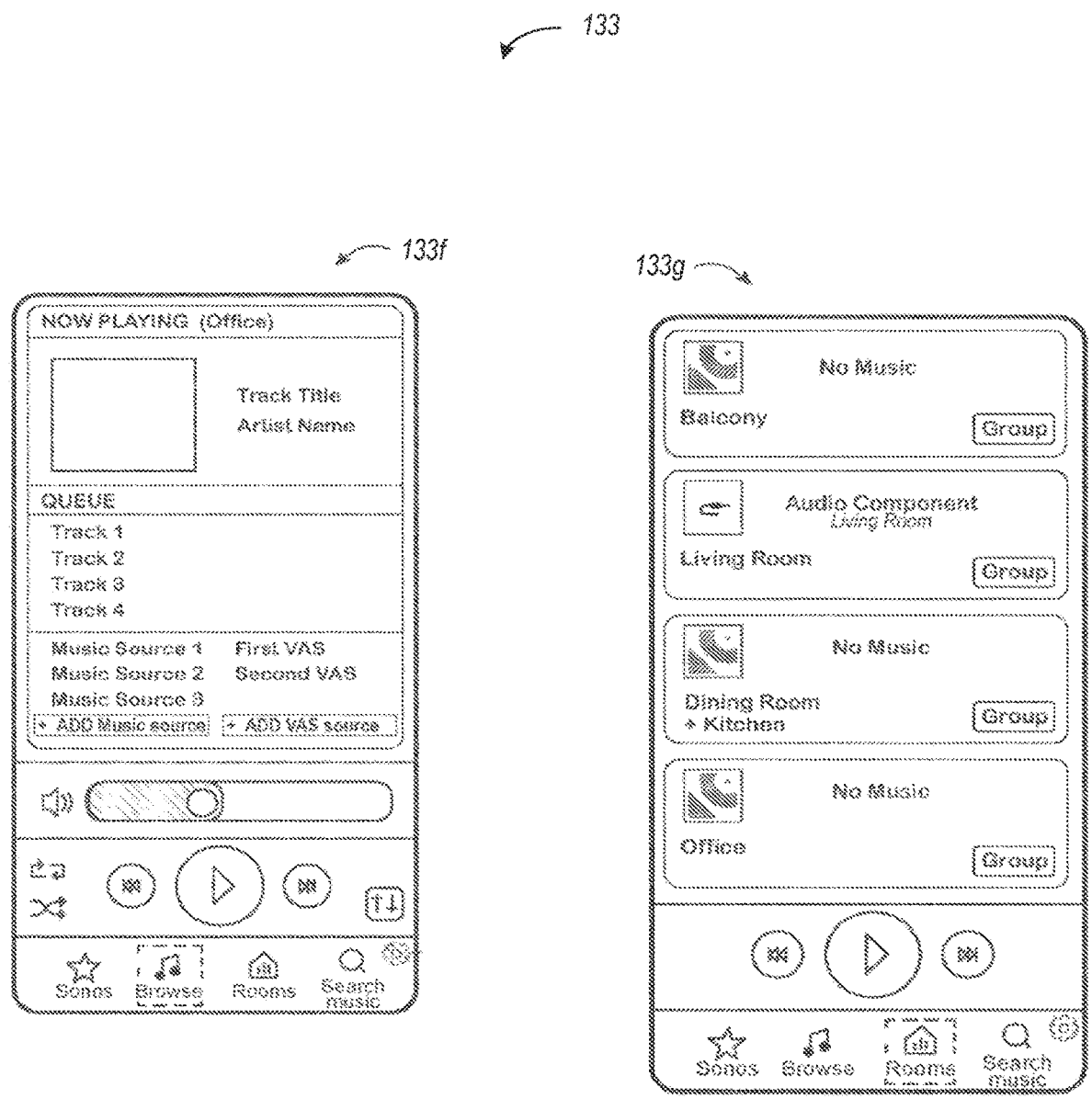
FIG. 1I is a schematic diagram of example user interfaces of the example control device of FIG. 1H.

The user interface 133 is configured to receive user input and can facilitate control of the MPS 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system. FIG. 1I shows two additional user interface displays 133f and 133g of user interface 133. Additional examples are also possible.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

e. Suitable Playback Device Configurations

Figure 2:
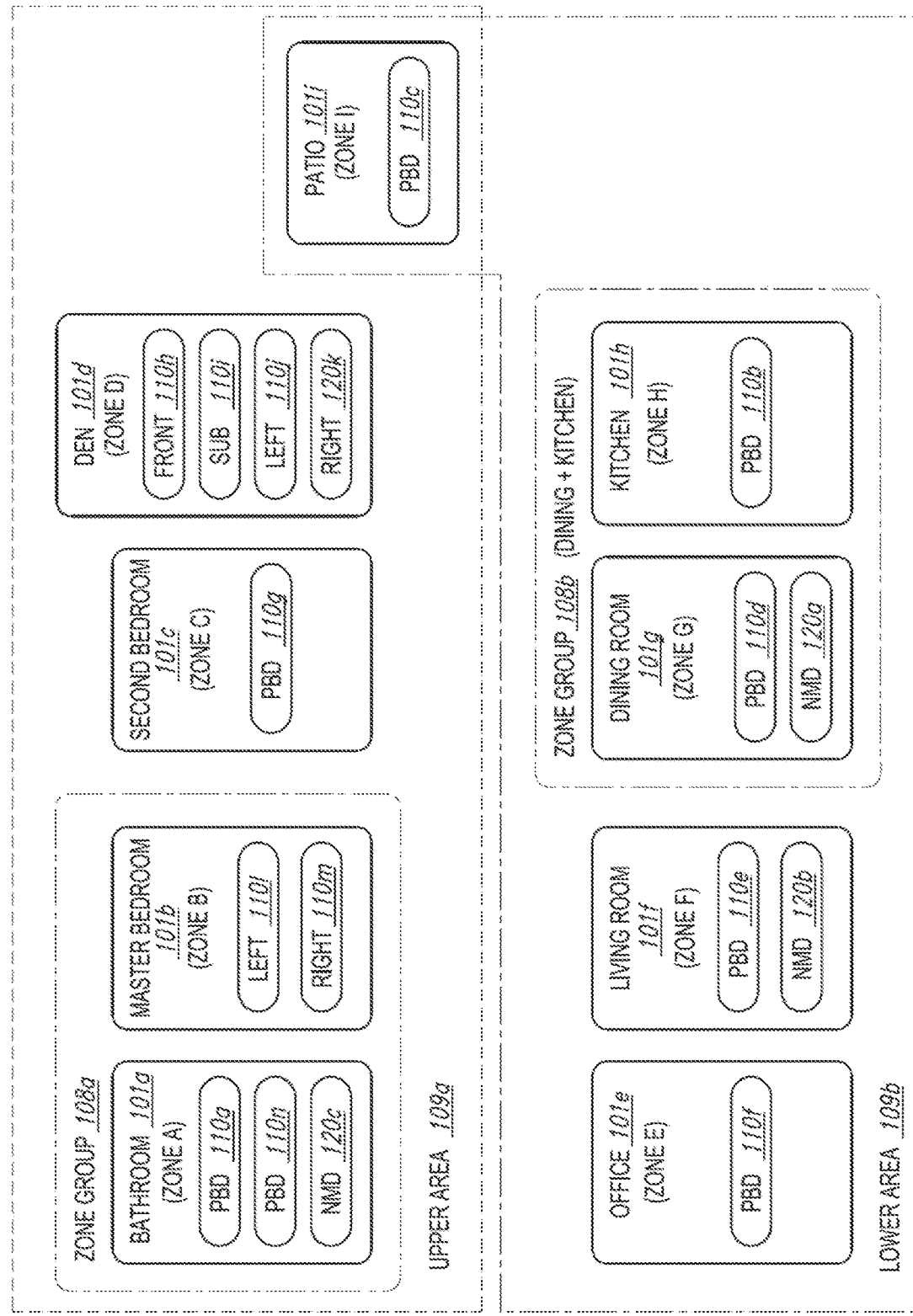
FIG. 2 is a schematic diagram of example media playback system areas.

FIGS. 1J through 2 show example configurations of playback devices in zones and zone groups. Referring first to FIG. 2, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110m (e.g., a right playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback zones 110g and 110h can be merged to form a merged group or a zone group 108b. The merged playback zones 110g and 110h may not be specifically assigned different playback responsibilities. That is, the merged playback zones 110h and 110i may, aside from playing audio content in synchrony, each play audio content as they would if they were not merged.

Each zone in the MPS 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1J, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1K, the playback device 110h named Front may be bonded with the playback device 110i named SUB. The Front device 110h can be configured to render a range of mid to high frequencies and the SUB device 110i can be configured to render low frequencies. When unbonded, however, the Front device 110h can be configured to render a full range of frequencies. As another example, FIG. 1L shows the Front and SUB devices 110h and 110i further bonded with Left and Right playback devices 110j and 110k, respectively. In some implementations, the Right and Left devices 110j and 110k can be configured to form surround or "satellite" channels of a home theater system. The bonded playback devices 110h, 110i, 110j, and 110k may form a single Zone D (FIG. 2).

Playback devices that are merged may not have assigned playback responsibilities and may each render the full range of audio content the respective playback device is capable of. Nevertheless, merged devices may be represented as a single UI entity (i.e., a zone, as discussed above). For instance, the playback devices 110a and 110n in the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 2, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 2. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1M). Identifiers associated with the Kitchen may indicate the same or similar information by virtue of the Kitchen being part of the Dining+Kitchen zone group 108b. Other example zone variables and identifiers are described below.

In yet another example, the MPS 100 may include variables or identifiers representing other associations of zones and zone groups, such as identifiers associated with Areas, as shown in FIG. 2. An area may involve a cluster of zone groups and/or zones not within a zone group. For instance, FIG. 2 shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. patent application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

Figure 3:
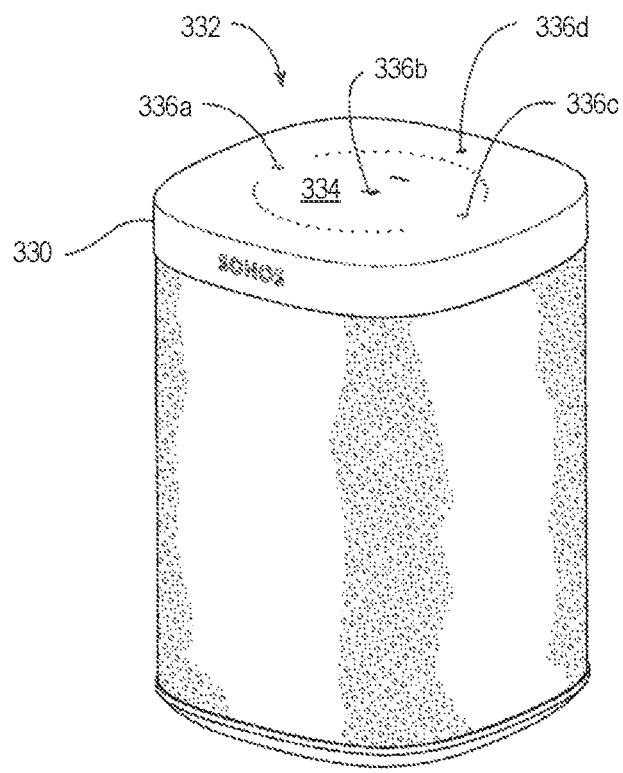
FIG. 3 is an isometric diagram of an example playback device housing.

FIG. 3 shows an example housing 330 of the playback device 110 that includes a user interface in the form of a control area 332 at a top portion 334 of the housing 330. The control area 332 includes buttons 336-c for controlling audio playback, volume level, and other functions. The control area 332 also includes a button 236d for toggling the microphones 222 to either an on state or an off state. The control area 332 is at least partially surrounded by apertures formed in the top portion 334 of the housing 330 through which the microphones 222 (not visible in FIG. 3) receive the sound in the environment of the playback device 110. The microphones 222 may be arranged in various positions along and/or within the top portion 334 or other areas of the housing 330 so as to detect sound from one or more directions relative to the playback device 110.

In some embodiments, the playback device 110 may take the form of a wired and/or wireless headphone (e.g., an over-ear headset, an on-ear headset, or an in-ear headset). For instance, FIG. 4 shows an example headset assembly 400 ("headset 400") for such an implementation of the playback device 110. As shown, the headset 400 includes a headband 402 that couples a first earcup 404a to a second earcup 404b. Each of the earcups 404a and 404b may house any portion of the electronic components in the playback device 110, such as one or more speakers. Further, one or more of the earcups 404*a* and 404*b* may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406*a* and 406*b* that are coupled to ear cups 404*a* and 404*b*, respectively. The ear cushions 406*a* and 406*b* may provide a soft barrier between the head of a user and the earcups 404*a* and 404*b*, respectively, to improve user comfort and/or provide acoustic isolation from the ambient (e.g., passive noise reduction (PNR)).

III. Example Experiences for Commercial Environments

Figure 5A:
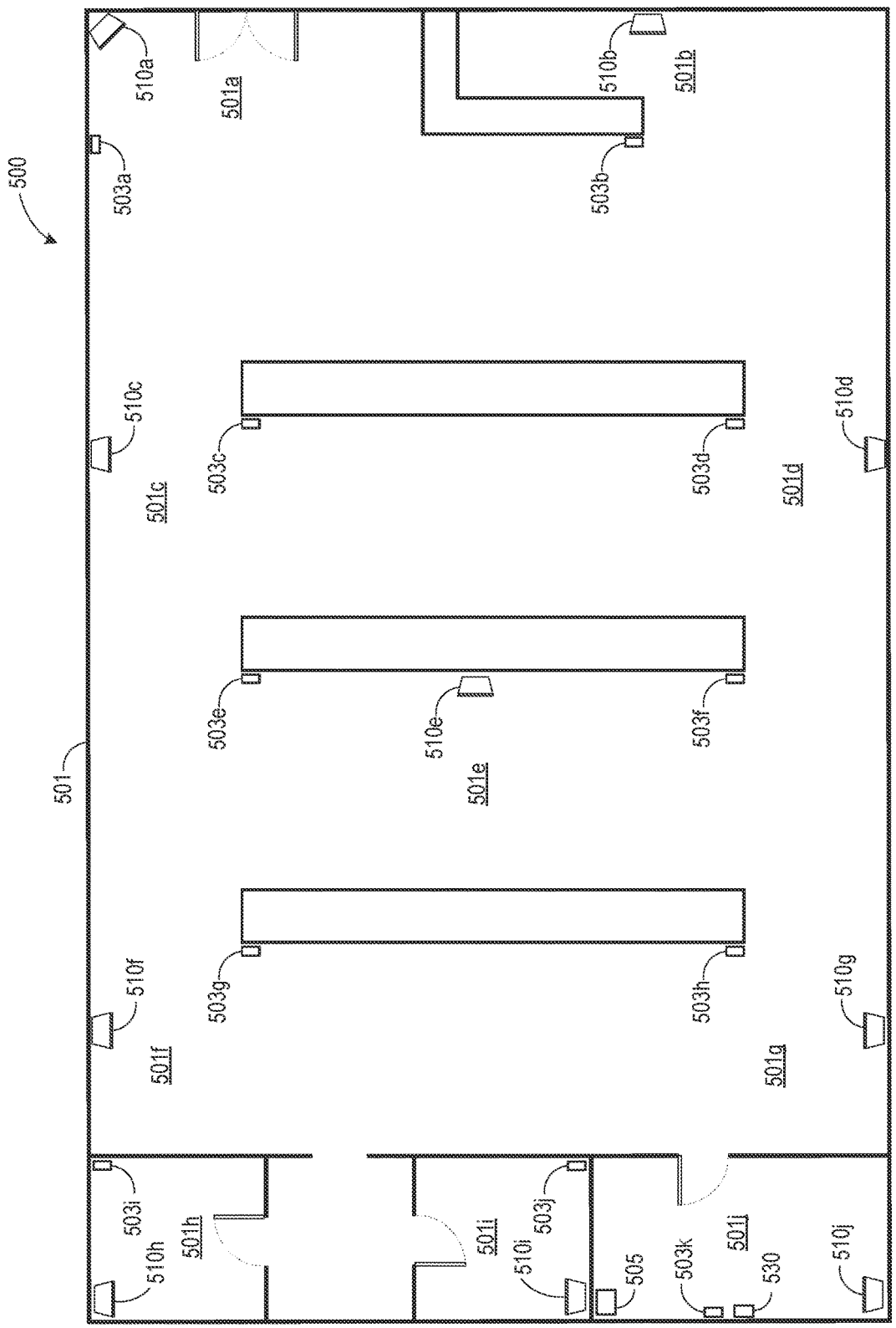
FIG. 5A is a view of a commercial environment having a media playback system configured in accordance with aspects of the disclosed technology.
Figure 5B:
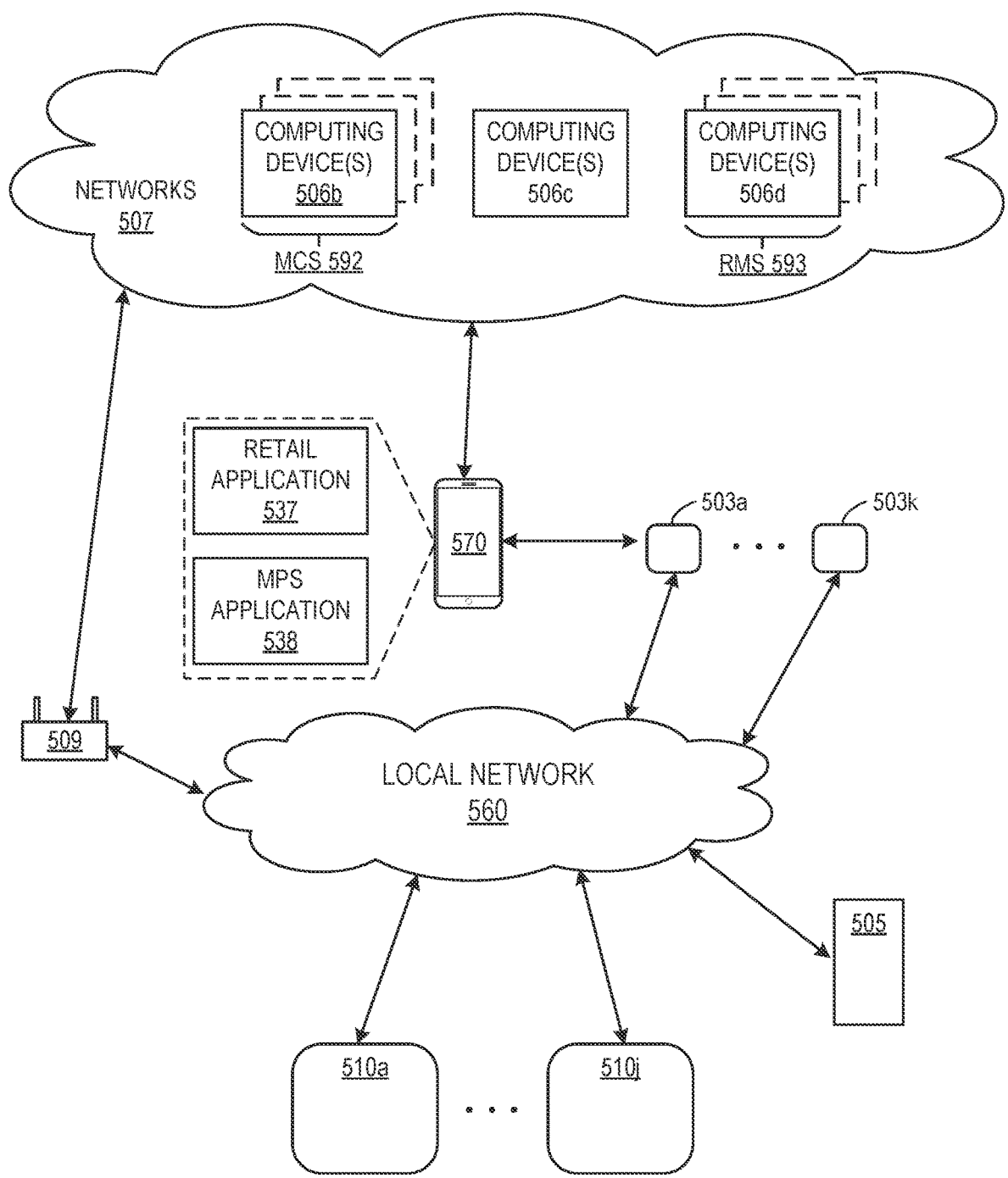
FIG. 5B is a schematic diagram of the media playback system of FIG. 5A and one or more networks.

FIG. 5A-5B illustrate another example configuration of a media playback system ("MPS") 500 similar to the one shown in FIGS. 1A-1B. However, FIGS. 5A-5B depict the MPS 500 implemented in a commercial environment 501, rather than a household environment. In this regard, the commercial environment 501 may take numerous forms. For instance, the commercial environment 501 may be a grocery store, a restaurant, a bookstore, a gym or similar workout facility, a clothing store, or a beauty salon. Various other examples of commercial environments, in which customers may make retail purchases or otherwise experience services offered in the commercial environment, are also possible.

As in the examples above, the MPS 500 may facilitate the playback of media content throughout the commercial environment 501. As such, the MPS 500 may include one or more playback devices 510 (identified individually as playback devices 510*a-j*). Each of the playback device 510 may be substantially the same as the playback devices 110 described in the examples above.

In the illustrated embodiment of FIG. 5A, the commercial environment 501 comprises one relatively large, open space and several smaller rooms. While the commercial environment 501, particularly the open space, might not be subdivided into individual rooms as extensively as the type of household environment 101 shown in FIG. 1A, the open space of commercial environment 501 may nonetheless include numerous different playback zones, supporting multiple playback devices 510. For instance, the open space may comprise an entryway zone 501*a* that includes a playback device 510*a*, which may play back audio content that is audible to customers entering the commercial environment 501 or perhaps approaching it from the outside. Similarly, the open space may comprise a checkout or front desk zone 501*b* that includes a playback device 510*b*. Other playback zones 501*c*, 501*d*, 501*e*, 501*f*, and 501*g* within the open space may be similarly named according to their use within the commercial environment 501 (e.g., a deli zone situated near the deli counter in a grocery store, a children's zone situated near the children's section in a bookstore, etc.), or perhaps according to a more generic naming convention (e.g., main floor seating zones 1-4 in a restaurant, etc.). Additional playback devices, including playback devices 510*c*, 510*d*, 510*e*, 510*f*, and 510*g* may be distributed in the open space 501*a* among these difference playback zones. Further, the playback zones 501*h*, 501*i*, and 501*j* in commercial environment 501 may correspond to individual rooms (e.g., fitting rooms in a clothing store, restrooms, and/or administrative rooms such as an office), and may include playback devices 510*h*, 510*i*, and 510*j*, respectively.

Alternatively, the open space of commercial environment 501 may be defined as a single playback zone that includes each of playback devices 510*a*-510*g* as a member. Various other logical arrangements of the playback devices in commercial environment 501 into playback zones, zone groups, and areas are also possible, as discussed above and shown by way of example in FIG. 2.

As shown in FIGS. 5A and 5B, the MPS 500 may also include one or more NMDs (not shown) and one or more control devices that may be substantially the same as the respective NMDs 120 and control devices 130 described in the examples above. For instance, FIG. 5A illustrates a control device 530, which may take the form of a smartphone or similar portable computing device, that is configured to receive user input for controlling operations of the MPS 500. A local computing device 505, which may take the form of a desktop computing device, may additionally include controller application software that allows it to act as a control device for the MPS 500.

The commercial environment 501 may additionally include one or more sensors 503 (identified individually as sensors 503*a-k*) that are positioned within the environment and may provide some indication of customer presence, and thereby provide some basis for the selection and presentation of media content. The sensors 503 may take various forms, such as motion sensors, cameras, infrared sensors, microphones, radio frequency sensors (e.g., BLE beacon sensors) that may identify the presence of a customer device (e.g., a BLE-enabled smartphone), or some combination of the above, among other possibilities.

In some embodiments, one or more of the sensors 503 may form a part of another system within the commercial environment 501 (e.g., a security system or an inventory tracking system) that is nominally unrelated to the MPS 500. Nonetheless, input from these sensors may be used as a basis for the selection and presentation of media content by the MPS 500, as further discussed below.

Additionally or alternatively, the sensors 503 may be installed within the commercial environment 501 as components of the MPS 500. In this regard, the sensors 503 may be standalone devices, may be included as a component of one or more of the playback device(s) 510 (e.g., a microphone array, BLE beacon sensor, or other sensor), or a combination of both.

Referring to FIG. 5B, the various playback devices, controller devices, sensors, and/or other network devices within the commercial environment 501 may be coupled to one another via point-to-point connections and/or over other connections, which may be wired and/or wireless, via a local network 560 that may include one or more network routers 509. The local network 560 may be, for example, a network that interconnects one or more devices within a limited area (e.g., a Wi-Fi network, a Bluetooth network, etc.), as described in the examples above.

The MPS 500 is configured to receive media content via the local network 560. The received media content can comprise, for example, a Uniform Resource Identifier (URI) and/or a Uniform Resource Locator (URL). For instance, in some examples, the MPS 500 can stream, download, or otherwise obtain data from a URI or a URL corresponding to the received media content.

Similar to the examples above, the MPS 500 may be coupled to one or more remote computing devices 506 via a wide area network ("WAN") 507. In some embodiments, each remote computing device 506 may take the form of one or more cloud servers. The remote computing devices 506 may be configured to interact with computing devices in the commercial environment 501 in various ways.

For instance, the remote computing devices 506 may include one or more voice assistant services (not shown) and one or more remote computing devices 506b associated with a media content service ("MCS") 592, as discussed above with respect to FIGS. 1A-1B. Further, the remote computing device 506 may include one or more remote computing devices 506d associated with a retail management service ("RMS") 593. RMSes 593 may communicate with one or more computing devices within the commercial environment 501, such as the sensors 503, a customer's mobile computing device 570, and/or the local computing device 505, to facilitate the operation of various systems of a business that is operating within the commercial environment 501. Such systems may include security systems, inventory and sales tracking systems, reservation and scheduling systems, customer loyalty and rewards systems, among numerous other possibilities.

The remote computing devices 506 shown in FIG. 5B may also include one or more computing devices 506c configured to perform certain operations related to the MCS 500, such as remotely facilitating media playback functions, managing device and system status information, directing communications between the devices of the MPS 500 and one or multiple VASes, MCSes, and/or RMSes, among other operations. In one example, the remote computing devices 506c provide cloud servers for one or more SONOS Wireless HiFi Systems. For instance, the computing devices 506c may be similar to, or the same as, the computing devices 106c shown in FIG. 1B and may provide media playback and system management services for the MPS 500, the MPS 100, and other media playback systems in various household, commercial, and other types of environments.

One or more of the remote computing devices 506c may be used to facilitate media playback functions across numerous commercial environments that are associated with the same media playback system account. For instance, a given business may operate in multiple different commercial environments in different locations (e.g., different cities), and may want to provide a similar audio content playback experience in all locations, or perhaps in only certain locations (e.g., grouped by geographic region). Thus, a user might make account-wide updates that are applied at one or more different commercial environments in which the business operates. For example, the user may apply a bulk update for all business locations to begin playing back holiday music content. All business locations may then begin playing the same holiday music content, or alternatively, different subsets of the business locations may play different holiday music content, e.g., depending on their locations or other demographic factors. In some cases, the user might make such account-wide changes from a control device located in one of the business's commercial environments 501, such as the location computing device 505 shown in FIG. 5B. Alternatively, a remote user might access a web-based dashboard for managing account-wide settings. Other examples are also possible.

A mobile computing device 570 is also shown in FIG. 5B, which may represent a smartphone or similar user device that may be carried by a customer (also referred to herein as a "user" or "listener") within the commercial environment 501. In this regard, it will be appreciated that numerous customers, each with a similar computing device 570, may be present within the commercial environment 501 at a given time. In some cases, the computing device(s) 570 may be installed with application software associated with the business that is operating within the commercial environment 501, such as store-specific mobile application software (referred to hereinafter as a "retail application 537") that communicates over the networks 507 with the RMS 593. The retail application 537 may allow a customer to create a user account associated with the business to facilitate online purchases, track loyalty/rewards, enable scheduling of appointments, provide coupons and other discounts, among other possibilities. In some embodiments, the retail application 537 may enable a customer to opt in to allow the retail application 537 to utilize certain features of the customer's computing device 570 (e.g., location services, Bluetooth access, NFC access, etc.) for an enhanced experience when the customer is present within the commercial environment 501. Examples of such experiences will be described in further detail below.

As shown in FIG. 5B, the computing device 570 may also be installed with a media playback system controller application software (referred to hereinafter as "MPS application 538") that the customer may use to control their own media playback system, such as the example household MPS 100. As one possibility that illustrates how the examples shown in FIGS. 1A-1B and FIG. 5A-5B may intersect, the computing device 570 may be the control device 130a shown in FIG. 1B. As such, the computing device 570 may have access to a user account associated with the provider of the MPS 100 (e.g., Sonos), the details of which may be accessible via the remote computing device 506b. For example, the customer's MPS user account may include any user profile information that the customer has elected to populate their account with (e.g., gender, age/generation, other interests, etc.), information regarding their particular musical preferences, favorites, and listening history, among other possibilities.

In some embodiments, one or both of the retail application 537 and the MPS application 538 may present the customer with the option to link their user account associated with the retail application 537 with their user account associated with the MPS application 538. This linking may allow one or both of the applications to exchange information that may be useful to the other, and may further enable the sharing of information among the computing devices 506b, 506c, and 506d in order to provide the customer with enhanced experiences when located in either or both of the MPS 500 and the MPS 100. As noted previously, such shared information may be limited to non-personally identifying information that the user has opted-in to share.

As one example, a MCS 592 (e.g., Sonos Radio) may be providing media content for playback within the commercial environment 501 via the MPS 500 when one or more of the computing devices 506b associated with the MCS 592 receives an indication that the computing device 570 has been detected within the commercial environment 501. Based on the detection of the computing device 570, the MCS 592 may determine one or more media items for playback by the MPS 500 that is based at least in part on the media preferences associated with the customer's own MPS user account.

In this regard, the computing device 570 may be detected within the commercial environment 501 in various ways. As one example, any of the computing device 570, the sensors 503, and/or the playback devices 510 may broadcast a beacon using a wireless communication protocol, such as a BLE beacon. The beacon may be detected by the computing device 570, or by the sensors 503 and/or playback devices 510 if broadcast by the computing device 570, and used to localize the computing device 570 within the commercial environment 501. As another example, any of the computing device 570, the sensors 503, and/or the playback devices 510 may transmit one or more high-frequency audio tones that are not audible to the human ear but are detectable by a microphone on the opposite device(s), allowing the computing device 570 to be localized in a similar way. Additional methods for localizing a computing device and/or a listener within a media playback system are disclosed in U.S. Pat. No. 9,084,058, which is incorporated by reference herein in its entirety.

As noted above and shown by way of example of FIG. 5B, the computing device 570 may engage in relatively limited point-to-point communications with one or more of the local computing devices in the commercial environment 501, such as the sensors 503 or the playback devices 510. Notably, however, the computing device 570 may not be connected to the local network 560 in the commercial environment 501. In these situations, the computing device 570 may communicate with one or more of the remote computing devices 506 more directly, via the networks 507.

a. Selection and Playback of Targeted Advertisements

As discussed above, the MCS 592 may provide media content for playback by the playback devices 510 within the commercial environment 501 based on information related to the business and/or customers that may be present within the commercial environment 501 at a given time. In some implementations, the media content may include advertisements that are inserted into internet radio programming provided by the MCS 592. In this regard, the advertisements may be selected based on various different types of information discussed above.

As one example, the pool of advertisements that may be selectable for playback within the commercial environment 501 may be tailored to the business that is operating therein. For instance, the pool of advertisements may exclude ads for the business's competitors, or for products and/or brands that are not carried by the business. Further, the pool of advertisements may tend to include products and services that have an overlapping demographic with customers of the business. For instance, the pool of advertisements that may be selected by the MCS 592 for playback in an organic grocery store may include advertisements for a yoga studio. Various other examples are also possible.

In some cases, the pool of advertisements for a given business may include advertisements for neighboring or otherwise complementary businesses. For instance, an advertisement for a coffee shop may be played by the media playback system in a nearby car mechanic's shop, suggesting to customers (e.g., implicitly, or perhaps explicitly in the advertisement) that the coffee shop may be a good place to wait for work to be done on their car. Similarly, ads for the car mechanic might be played at the coffee shop. In these situations, the two businesses may have reached an agreement for this type of advertising exchange, which may be facilitated by the media service provider as discussed further below. Other examples are also possible.

As another example, the MCS 592 may select an advertisement for playback by a given playback device 510 based on the location of the playback zone within the commercial environment 501. For instance, advertisements for alcohol may be selected for a playback zone near the alcoholic drinks section of a grocery store, or an advertisement for toys may be selected for a playback zone near a children's section of a clothing store. Additional methods for selecting and playing back advertisements in different playback zones of a media playback system are disclosed in U.S. patent application Ser. No. 16/680,232, which is incorporated by reference herein it its entirety.

An additional extension of selecting advertisements based on the location of a playback zone within the commercial environment 501 may include selecting advertisements based on a projected future location of a customer within the commercial environment 501. For instance, advertisements for bread products may be selected for playback in a playback zone located near the deli counter of a grocery store, in anticipation that customer s who visit the deli counter may later visit the bread aisle. Further, a customer's projected future location may not be limited to the commercial environment 501 but might also include nearby businesses.

As yet another example, an advertisement for a given product may have multiple different versions, and the version of the advertisement that is played back may be selected based on a particular customer demographic that is associated with the business. For instance, multiple different versions of an advertisement for Fender Musical Instruments may exist, where each version features a different musician that is popular in a different genre of music (e.g., country, rock, metal, etc.). Accordingly, the MCS 592 may select from the different versions based on the version of the advertisement that most closely aligns with the brand identity of the business and/or the known demographic of the business's customers, which may be provided to the MCS 592 by the RMS 593. In this regard, customer demographics of a given business may vary along several dimensions such as geographical location (e.g., different locations of the same business), time of day, time of year, among other possibilities.

In a similar way, if the MCS 592 receives an indication that the computing device 570 is detected in a particular playback zone within the commercial environment 501, the MCS 592 may select an advertisement for playback in that playback zone based on information from the MPS user account associated with the computing device 570. For instance, the MCS 592 may select a version of the Fender Musical Instruments advertisement noted above that features a rock musician because songs by that musician (or similar musicians) appear in the playback history of the customer's MPS user account.

As yet another example, the MCS 592 may select certain advertisements based on product-specific information for the business, such as inventory and historical sales data, which may be provided by the RMS 593. For instance, an advertisement for a particular item might only be selected for playback within the commercial environment 501 if the item is currently in stock. As another possibility, a customer may utilize the retail application 537 to search for a given product, scan a barcode, apply a coupon, or otherwise indicate interest in the given product. Using historical sales data for the business that indicates customer buying patterns, an advertisement for a complimentary product that is frequently purchased with the given product may be selected and played in the customer's location within the commercial environment 501.

In some embodiments, the same music content provided by the MCS 592 may be played in synchrony throughout most or all playback zones of the commercial environment 501, while different advertisements may be overlaid (e.g., by ducking the underlying music content) in different playback zones, as noted above. In these scenarios, it may be preferable to stagger the timing of advertisements between playback zones such that two different advertisements are not played in adjacent playback zones at the same time. For instance, if a customer is located near the approximate boundary between two playback zones, it may be distracting if two different advertisements are both audible at the same time.

As yet another example, the MCS 592 may select advertisements based on their similarity to characteristics of the underlying musical content. For instance, if an advertisement is to be played between two songs of an internet radio program, a longer advertisement that includes background music may be selected in order to provide a more continuous audio experience. Similarly, if an advertisement is to be played during a break of a spoken-word podcast, a voice-based ad may be selected. Further, if an advertisement will overlay relatively quieter content, such as classical music, or relatively louder content, such as rock music, an advertisement with a corresponding energy level may be selected. In other embodiments, an advertisement may be selected based on its dissimilarity to the underlying musical content, in order to provide an intentionally contrasting experience.

In some implementations, a given advertisement may have separate voice and music components, which may each have different variations. For example, the voice portion of a given advertisement may be paired with one of several different musical backing options. The musical portion may be selected based on any of the factors discussed above used to select advertisements in general, such as its compatibility with the underlying content. As one possibility, the musical portion of a given advertisement may include generative content (e.g., algorithmically generated musical content) that is based on one or more factors such as the detectable characteristics of the voice portion and/or the surrounding commercial environment 501. Various examples of generative musical content are discussed in U.S. Provisional Application No. 63/198,866 entitled "Algorithmically Generated Media Content Playback via one or more Devices" and filed Nov. 18, 2020, U.S. Provisional Application No. 62/956,771 entitled "Generative Music Based on User Location" and filed Jan. 3, 2020, and U.S. Provisional Application No. 62/706,544 entitled "Mood Detection via Audio Playback Devices" and filed Aug. 24, 2020. Each of these applications is incorporated by reference herein in its entirety.

Along the same lines, the MCS 592 may be configured to select advertisements based on an approximation of the mood within the commercial environment 501. For instance, data from one or more of the sensors 503 (e.g., motion sensors, cameras, etc.) may indicate a relatively high degree of customer traffic such that a relatively higher-energy advertisement may be most effective. Similarly, data from one or more of the sensors 503 and/or playback devices 510 (e.g., microphones) may indicate that a restaurant or bookstore is relatively quiet such that a relatively lower-energy advertisement may be more appropriate. In many cases, the characteristics of the underlying musical content that is provided by the MCS 592, which may itself be a primary driver of mood within the commercial environment 501, may be the most reliable indication of mood for purposes of advertisement selection.

As mentioned above, in some cases the advertisements that are selected by the MCS 592 may be inserted during playback of underlying content by, for example, ducking the underlying content. In this regard, there may be certain times within the underlying content that are better for advertisement insertion than others. For example, some podcasts may include natural breaks between topics, which may be a natural breaking point for insertion of an advertisement. Further, some songs may include long instrumental portions during which ads may be overlaid with relatively less disruption to the song. Accordingly, in some cases the MCS 592 may determine, based on an analysis of the underlying media content, a location within the underlying media content for the insertion of advertisements.

In some further embodiments, audio advertisements that are played within the commercial environment 501 may be played in coordination with video content. In some examples, the video content may take the form of a coupon that may be displayed via the computing device 572. In other examples, an audio advertisement may be synchronized with a video advertisement that is presented via one or more displays in the commercial environment. The synchronized audio and visual advertisements may be played periodically, when a customer is detected (e.g., via one or more sensors 503) near the display, or only when a customer engages with the display. Alternatively, the video advertisement may play in a loop, and the synchronized audio portion may be played only when a customer is detected nearby. Additional details related to the synchronization of content between devices is discussed in U.S. Pat. No. 10,098,082, which is incorporated by reference herein in its entirety.

As another possibility, if a customer engages with a given product via the retail application 537, as discussed above, a prompt for a video advertisement may be presented in the retail application 537. If the user selects the prompt, the RMS 593 may coordinate with the MCS 592 such that the video advertisement may be played via the computing device 570 while one or more of the playback devices 510 play an overlaid audio advertisement in synchrony with the video advertisement.

In some cases, one or both of the retail application 537 and the MPS application 538 may be configured to maintain a log of the advertisements that the customer heard (or likely heard), based on their location within the commercial environment 501 during a given time period. This may be useful, for example, if the customer wants to later recall an advertisement they heard while at the commercial environment 501. In this situation, the customer may be prompted with a corresponding video version of the advertisement, which they may play via the computing device 570. In a similar embodiment, the customer may, upon hearing an advertisement at the commercial environment 501, indicate via the retail application 537 or the MPS application 538 that they wish to "save" the advertisement in order to refer to it later. In some cases, in addition to flagging the advertisements in one or both applications on the computing device 570, this may cause the advertisement to be played back again at a later time by the user's household MPS 100. For instance, a saved advertisement for a product related to cooking may be replayed in a Kitchen playback zone of the user's MPS 100.

As an additional benefit, the tracking of advertisements noted above may be used to estimate the efficacy of a given advertisement. For instance, it may be possible to determine whether customers who likely heard an advertisement, based on their location with the commercial environment 501 at a given time, later made a corresponding purchase of the advertised product, either in-store or online, based on their purchasing activity reflected in the retail application 537. In addition, because the MPS application 538 may track advertisements the customer has heard in various different commercial environments, as well as their home environment 101, it may be possible to determine that the customer made a purchase in the commercial environment 501 based on an advertisement that they heard elsewhere.

In some cases, this type of correlation between advertisement placement and subsequent purchasing may provide for unique revenue sharing opportunities between businesses.

For example, a media content provider may credit the business (e.g., credit the commercial media service account of the business) operating in commercial environment 501 if an advertisement that a customer heard in commercial environment 501 leads to a purchase, even if the purchase is from a different business. Various other examples for the correlation of advertisements and customer purchases are also possible.

b. Media Content Curation and Creation

At a high level, the MCS 592 may provide media content for playback, such as an internet radio station that includes music content programming in conjunction with the advertisements discussed above. In some cases, the music content may be curated to correspond to the particular type of business operating in the commercial environment 501. For instance, the music content that is curated for a gym may be different than the music content that is curated for a coffee shop, and the music content may be further curated based on the demographics of the particular business, as discussed above with respect to the selection of advertisements. In some cases, the music content may be manually curated to include certain songs that are associated with the business as a theme song, or artists that are affiliated with the business as a spokesperson, among other possibilities.

Further, different playback zones in different areas of the commercial environment 501 may play back different content, or perhaps different versions of similar content. For instance, a given song may be played in synchrony among numerous playback zones of the commercial environment 501, however a playback zone where conversations are likely to occur (e.g., a deli counter, a check out area) may play back an instrumental version of the song in order to facilitate such conversations. Additionally or alternatively, playback volume or equalization settings may be varied between different playback zones, and/or between different playback devices in a playback zone, of the commercial environment 501. As above, these settings may be manually selected to meet a particular need, such as facilitating conversations or providing some degree of audio isolation (e.g., in a fitting room or restroom).

In some implementations, media content for a given business may be selected by rules-based curation instead of, or in combination with, manual content curation. For instance, for a gym operating in the commercial environment 501, the MCS 592 may be configured to select music content for playback having beats per minute ("BPM") above a minimum threshold BPM, whereas a bookstore may be designated for music content having BPM below a maximum threshold BPM, or for voice-only media content. As another possibility, an island-themed business may have a preference for ukulele versions of songs, and the MCS 592 may select these versions for playback in lieu of the typical format, when available. Numerous other rules-based criteria for the selection of media content in the commercial environment 501 are also possible, including media content corresponding to different times of day, days of the week, seasons (e.g., holiday season), among others.

Additionally or alternatively, determining rules-based media content for a given business operating in the commercial environment 501 may include the creation of generative music content (e.g., algorithmically generated music content), in line with the discussion of generative content above. Accordingly, references herein to the "selection" of music content or media items by the MCS 592 may also encompass the "generation" of music content or media items in this way.

Further, the criteria for selection or generation of media content that is to be played back in the commercial environment 501 may be updated based on real-time inputs from the commercial environment 501. For instance, the MCS 592 may select music content for playback based on the volume of customer traffic in the commercial environment 501, as discussed above with regard to the selection of advertisements. As another example, media content may be selected based on local news or events. For instance, if a given artist will be playing an upcoming show in the area, the MCS 592 may select media content by the artist for playback in advance of the date that tickets to the show go on sale. The MCS 592 may additionally play back an advertisement to buy the tickets in conjunction with the media content by the artist.

As another possibility, the MCS 592 may generate and/or utilize listener profiles that are aligned with certain types of demographic information. Such listener profiles may be generated by aggregating and analyzing large amounts of user data across various different media playback systems in different environments, such as the MPS 100. For example, if a user of MPS 100 has elected to share such information (e.g., non-personally identifying information such as listening history), the MPS 100 may correlate the user's listening habits across the user's various music services with the user's interests and other information (e.g., general demographic information) in the user's media playback system account profile. This correlated information may be provided to one or more of the computing devices 506b associated with MCS 592 and combined with similar information from other media playback systems (e.g., via one or more of the computing devices 506c) to create various different listener profiles. As some possibilities, the MCS 592 may generate listener profiles for listeners in a given age range, in a given geographic area, and/or with a given interest or set of interests, among numerous other possibilities, and in various combinations. A business operating in the commercial environment 501 may then select one of the generated listener profiles, which may align with a target demographic for the business's customers, for the MCS 592 to use as the basis for the selection and playback of media content in the commercial environment 501.

In further embodiments, and similar to the selection of customer-specific advertisements discussed above, the MCS 592 may select music content for playback within the commercial environment 501 based on the music preferences of a customer that is detected within the commercial environment by way of the computing device 570. As noted above, this detection may be accomplished passively if the customer opts-in to allow for beaconing (e.g., BLE or high-frequency audio beacons) between the computing device 570 and one or more of the sensors 503 and/or playback device 510 in the commercial environment 501. Additionally or alternatively, the customer may actively indicate their presence within the commercial environment 501 in various ways, and by doing so explicitly request that the media content be selected based on their preferences, where possible. For instance, the customer may a selection within the retail application 537 to "check-in" at the business or may engage a near-field communications ("NFC") terminal in the commercial environment 501 with the computing device 570, among other possibilities.

Once the computing device 570 associated with a customer has been detected within the commercial environment, the customer's musical preferences may be used to curate media content for playback within the commercial environment 501. For instance, the customer's music preferences associated with their household MPS, as represented in the MPS application 538, may be copied to or otherwise linked with the retail application 537 on the computing device 570. Additionally or alternatively, the linking of user accounts for the two applications and the subsequent sharing of information between them may occur among the remote computing devices 506. In this way, both of the retail application 537 and the MPS application 538 might not need to be present on the computing device 570. For example, the customer might not have the retail application 537 installed on their computing device 570, but the customer may have nonetheless linked their MPS user account with an online user account for the business that operates in the commercial environment 501.

A customer's music preferences may be used for the selection of media content in various ways, including those discussed above with respect to the selection of advertisements. Additional approaches for selecting media content based on user preferences are described in U.S. Pat. No. 10,678,500 entitled "Audio Track Selection and Playback," U.S. Pat. No. 10,129,599 entitled "Media Preference Database," U.S. Pat. No. 9,478,247 entitled "Management of Media Content Playback," U.S. Pat. No. 9,524,338 entitled "Playback of Media Content According to Media Preferences," and U.S. Pat. No. 9,680,960 "Receiving Media Content Based on Media Preferences of Multiple Users." Each of these patents is incorporated by reference herein in its entirety.

In further implementations, the MCS 592 may keep a record of what media items a customer heard, or likely heard, based on the determined location of the computing device 570 within the commercial environment 501 at a given time. This information might be used by the MCS 592 to determine whether there are correlations between playback of a given media item and customer traffic within the commercial environment. For instance, the MCS 592 and/or the RMS 593 may determine that customer traffic in a playback zone tends to increase, or that customers tend to dwell in the playback zone for longer, when a particular song is played, which may indicate that customers like the song. The MCS 592 might also determine the opposite—that customers tend to vacate a playback zone with a given media item is played, possibly indicating dislike for the song. As another possibility, location information for the computing device 570 might be used to solicit feedback from the customer at a later time through a survey that is presented via one or both of the retail application 537 or the MPS application 538. The survey may inquire, for example, whether the customer recalled hearing a particular song, and whether they enjoyed the song.

In some embodiments, a customer's computing device 570 may be installed with a MPS application 538 that may be configured to interact with the sensors 503 and/or the playback devices 510 as discussed above, but the computing device 570 may not yet be installed with the retail application 537. In these cases, one or more of the playback devices 510 may transmit a link to the computing device 570 that may facilitate downloading the retail application 537. For instance, a playback device 510 may transmit a high-frequency audio signal that contains information for the link. The computing device 570 may receive the information and the MPS application 538 may cause a notification including the link to be displayed via the computing device 570.

As discussed above, the retail application 537 installed on a customer's computing device 570 may be integrated with the MPS 500 in various ways. For example, the retail application 537 may include a "Now Playing" indication that provides the customer with information about what they are hearing (e.g., song title, artist name, album information) in the commercial environment 501, and may further include an option for the user to select whether they like or dislike a given song. In situations where the retail application 537 is not present on the computing device 570, this functionality might alternatively be provided by the MPS application 538. In situations where the retail application 537 provides an option for a user to indicate a like or dislike for a currently playing song, this information may be shared with the MPS application 538 on the computing device 570 and further inform the customer's music preferences within their own MPS 100. For example, an indication in the retail application 537 that the user liked a song that was played in the commercial environment 501 may cause the song to be replayed in the user's home environment 101 at a later time. Further, an indication that a customer like or dislikes a given song heard within the commercial environment 501 may be used by the MCS 592 and/or the business to influence the curation of media content for the commercial environment 501. In this way, a business may crowdsource media content preferences from their customers.

In some implementations, one or both of the retail application 537 and/or the MPS application 538 may facilitate direct control of the media content that is played within the commercial environment 501. For instance, a customer may enter playback zone 501h of the commercial environment 501, which may be a fitting room of a clothing store. The sensor 503i in playback zone 501h may detect the presence of the computing device 570 as discussed above (e.g., a BLE or high-frequency audio beacon, an NFC exchange, etc.). In response, the retail application 537 and/or the MPS application 538 may enable the user to select the music for playback (e.g., from among a set of options) in the playback zone 501h. After the computing device 570 is no longer detected in proximity to the sensor 503i, or after a timeout period, the MCS 592 may disable control input from the computing device 570. Other examples of providing limited user control of the content selection within the commercial environment 501 are also possible.

As yet another possibility, a customer may indicate, either via the retail application 537 or the MPS application 538 that the customer wishes to continue listening to the media content that is currently playing back in the commercial environment 501 after the customer leaves. For example, the customer may enjoy a particular song and/or playlist that has been playing while they were in commercial environment 501, and the customer may wish to continue playback of the media content as a portable playback session that may follow the customer. The portable playback session may be initiated at the computing device 570 based on the indication from the customer, and the computing device 570 may begin playback at the current playback position of the media content in the commercial environment 501. The portable playback session may then be played back by the computing device 570 or by a portable playback device linked to the computing device 570, such as the portable playback device 110o discussed above and shown in FIG. 1B. Further, the portable playback session may be further transferred to another playback environment, such as a vehicle, or the customer's home environment 101. Numerous other implementations for allowing a customer to "take music with them" and transfer playing content between environments are also possible, including examples discussed in U.S. patent application Ser. No. 16/805,130 entitled "Playback Transitions," which is incorporated by reference herein in its entirety.

In these types of situations where a customer transfers playback of media content (e.g., internet radio programming) from one environment to another, advertisements that are inserted into the media content may be updated based on the change in environment. Further, some media content that is played in a commercial environment 501 may include a business-specific or brand-specific playlist that may only available if a customer has installed the retail application 537 on the computing device 570.

Figure 6:
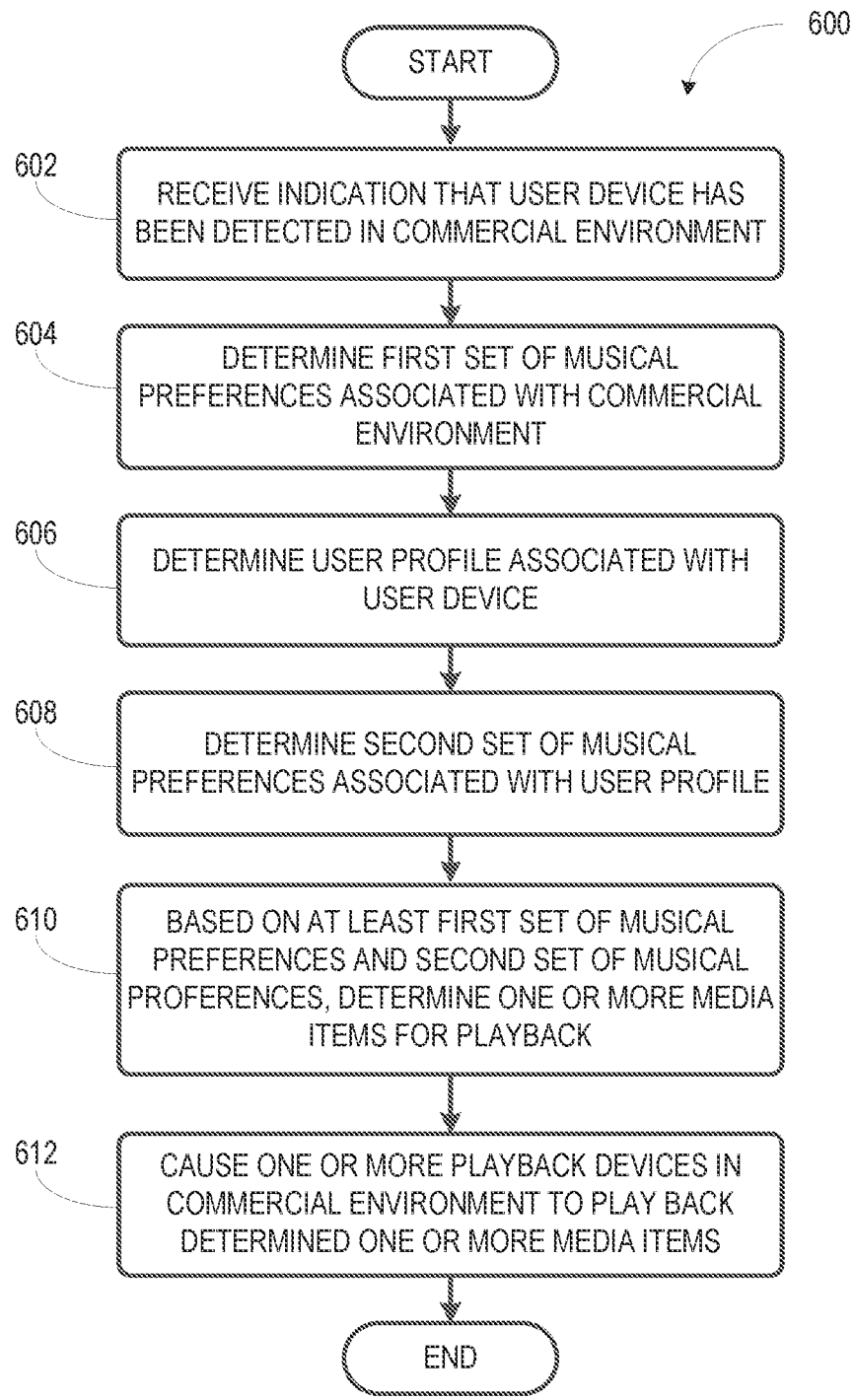
FIG. 6 is a flowchart showing example operations of a media playback system in a commercial environment.

FIG. 6 is a flowchart of an example method 600 for determining media content for playback within a commercial environment, such as the commercial environment 501. The method 600 may be carried out by one or more of the remote playback devices 506 shown in FIG. 5B and discussed above.

At block 602, the method involves receiving an indication that a user device has been detected in a commercial environment. For example, as discussed above, a remote computing device 506*b* associated with MCS 592 may receive an indication that a user device, such as the computing device 570 has been detected in the commercial environment 501. In some cases, the indication may be based on at least one or more of receiving a BLE beacon transmitted by the computing device 570, detecting an audio tone transmitted by the computing device 570, or detecting a NFC interaction between the computing device 570 and an NFC device, such as one of the sensors 503, located in the commercial environment 501. Various other examples are also possible as detailed above, including examples in which a beacon or audio tone originates from one of the playback devices 510 and is detected by the computing device 570, which may then provide the indication to one or more of the remote computing devices 506. Further, certain types of detected noted above may be used to localize the computing device 570 in the commercial environment and thereby provide an indication that the computing device 570 has been detected at a particular location in the commercial environment 501, such as a particular playback zone.

At block 604, the method 600 involves determining a first set of musical preferences associated with the commercial environment 501. For instance, the business operating in the commercial environment 501 may designate certain artists, genres of music, customer demographics, or other rules to be used as the basis for the selection and playback of media content in the commercial environment 501. Further, as discussed above, the selection of advertisements that are played as part of the media content may be similarly based on various rules and preferences.

At block 606, the method 600 involves determining a user profile associated with the computing device 570 and at block 608, determining a second set of musical preferences associated with the user profile. For example, as discussed above, the computing device 570 may be installed with a MPS application 538 that is associated with a user profile of the customer's MPS user account. The user profile may include a set of musical preferences for the customer based on the playback activity of the customer in their own household environment 101 via MPS 100. In some cases, the MPS user account may be linked with a user account associated with the business operating in the commercial environment 501, which may allow the customer's musical preferences to be shared among the remote computing devices 506, as discussed above.

At block 610, the method 600 involves determining one or more media items for playback based on at least the first set of musical preferences associated with the commercial environment 501 and the second set of musical preferences associated with the user profile. As one example, MCS 592 may select, from a pool of advertisement that have been curated for playback in the commercial environment 501 based on product-based and/or demographics-based preferences of the business, one of the advertisements for playback that corresponds to the musical preferences of the customer whose computing device 570 was detected in the commercial environment 501. As another example, the MCS 592 may select a song for playback in the commercial environment 501 based on an indication in the customer's musical preferences that they like the song. However, the MCS 592 may select an instrumental version of the song based on the determined location of the computing device 572 in a playback zone where the business prefers to minimize disruptions to conversations. Numerous other examples of determining media items for playback based on the first and second set of musical preferences are possible.

At block 612, the method 600 involves causing one or more playback devices 510 in the commercial environment 501 to play back the one or more media items that were determined based on the first and second set of musical preferences. As noted above, in situations where the computing device 572 was detected in a particular location in the commercial environment 501, the method may involve causing one or more playback devices 510 at the particular location (e.g., in a particular playback zone) to play back the one or more media items.

Figure 7:
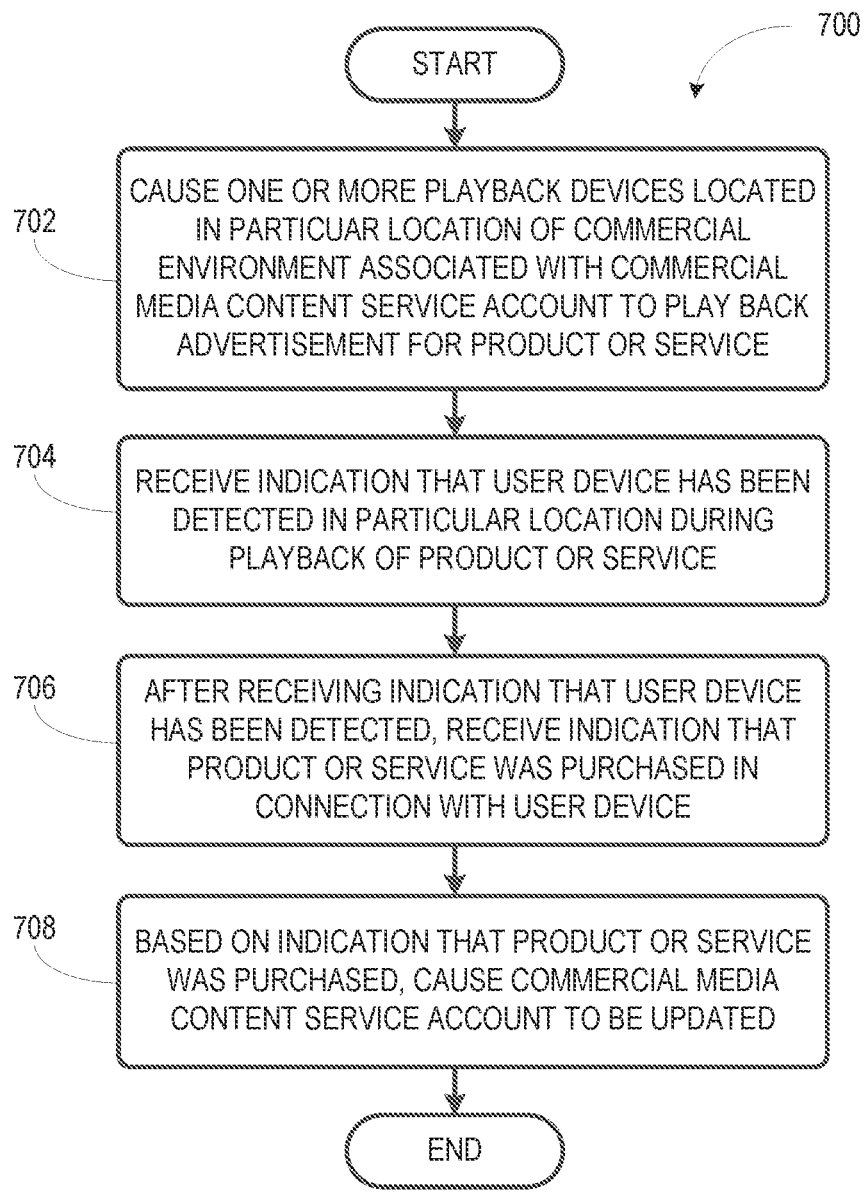
FIG. 7 is a flowchart showing example operations for tracking and crediting purchases based on advertisements played in a commercial environment.

FIG. 7 is a flowchart of an example method 700 for tracking and crediting purchases based on advertisements played in a commercial environment, such as the commercial environment 501. The method 700 may be carried out by one or more of the remote playback devices 506 shown in FIG. 5B and discussed above.

At block 702, the method involves causing one or more playback devices located in a particular location of the commercial environment 501 that is associated with a commercial media content service account to play back an advertisement for a product or service. For example, a remote computing device 506*b* associated with MCS 592 may cause one or more of the playback devices 510 in commercial environment 501 to play back the advertisement, as discussed in the examples above.

At block 704, the method involves receiving an indication that a user device, such as the computing device 570, has been detected in the particular location in the commercial environment 501 during playback of the advertisement for the product or service. For example, one or more of the remote computing devices 506 may receive an indication from one or more sensors 503 in the commercial environment 501 indicating that the computing device 570 was detected in the particular location. As discussed above, this information may indicate that the user of computing device 570 heard, or likely heard, the advertisement.

At block 706, after receiving the indication that the user device has been detected, the method involves receiving an indication that the product or service that was the subject of the advertisement was purchased in connection with the computing device 570. In this regard, the product or service might be purchased somewhere other than the commercial environment 501.

This indication that the product or service was purchased in connection with the computing device 570 may be received in various ways. As one example, the computing device 570 may be installed with a retail application for the business where the purchase was made, and the user may have elected to link their user accounts, as discussed above, such that their purchasing history with the business is shared, via the retail application, with one or more of the computing devices 506. As another possibility, the user of computing device 570 may have selected an option to save a coupon for the product or service that was visually displayed or otherwise conveyed to the user via the computing device 570 during (or after) playback of the advertisement in the commercial environment 501. In these situations, the indication that the product or service was purchased in connection with the computing device 570 is apparent when the user later utilizes the saved coupon. Various other implementations are also possible.

At block 708, based on the indication that the product or services was purchased in connection with the computing device 570, the method involves causing the commercial media content service account associated with the commercial environment 501 to be updated. For example, as noted above, the business operating in commercial environment 501 may be credited when advertisements that customers hear in the commercial environment 501 lead to later customer purchases, even from other businesses. Thus, the business's commercial media content service account may be updated to reflect the credit. As one possibility, the business might receive discounted placement fees for their own advertisements that are played by the MCS 592. Numerous other possibilities also exist.

Figure 8:
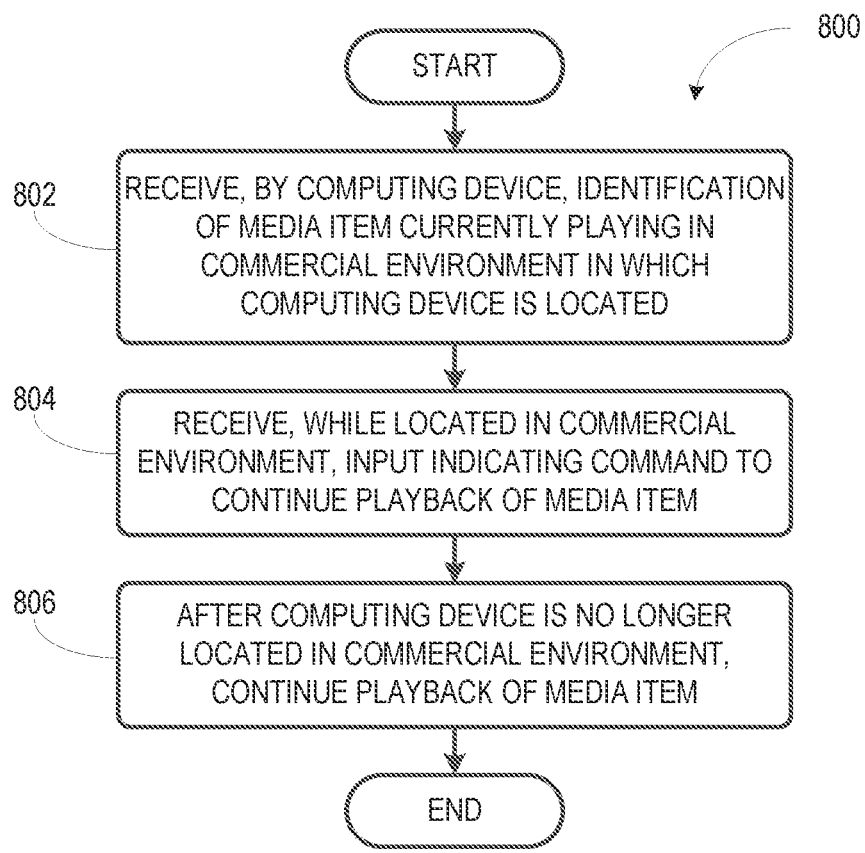
FIG. 8 is a flowchart showing example operations for transferring playback from a media playback system in a commercial environment to different media playback system.

FIG. 8 is a flowchart of an example method 800 for transferring playback from a media playback system in a commercial environment, such as the MPS 500 in commercial environment 501, to different media playback system, such as the MPS 100. For example, the method 800 may be carried out by a user device, such as the computing device 570.

At block 802, the method involves the computing device 570 receiving an identification of a media item that is currently playing in the commercial environment 501, in which the computing device 570 is located. For instance, based on the detection of the computing device 570 in the commercial environment 501, as discussed in the examples above, the computing device 570 may receive (e.g., via the retail application 537 and/or the MPS application 538) an identification of the media item that is currently playing.

At block 804, the method may involve receiving, while the computing device 570 is located in the commercial environment 501, an input indicating a command to continue playback of the media item. Then, at block 806, the method involves continuing playback of the media item after the computing device 570 is no longer located in the commercial environment.

In some cases, the command to continue playback of the media item may involve a command for the computing device 570 to begin playback of the media item from the current playback position, such that the user may have a continuous music experience when they leave the commercial environment. As another possibility, the command to continue playback may include a command to continue playback at a later time. For instance, selection of the command might cause the computing device 570 to save information regarding the current playback position of the media item when the command was received. This may allow the user to resume playback from the saved playback position at a later time after leaving the commercial environment 501, such as when they reach their car or when they arrive home to the MPS 100. Alternatively, the computing device 570 may restart the media item from the beginning when the user resumes playback. Other implementations are also possible.

Some of the figures discussed herein include one or more operations, functions, or actions as illustrated by one or more of operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowcharts shown in the figures and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block may represent circuitry and/or machinery that is wired or arranged to perform the specific functions in the process.

VI. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing system comprising:
   at least one processor;
   at least one non-transitory computer-readable medium; and
   program instructions stored on the non-transitory computer-readable medium that are executable by the at least one processor such that the computing system is configured to:
   cause one or more playback devices located in a first location of a commercial environment to play back an advertisement for a given product or a given service;
   based on sensor data received from one or more sensors within the commercial environment, determine that a user device is detected proximate to the first location in the commercial environment during playback of the advertisement;
   determine a user profile associated with the user device;
   after determining that the user device has been detected proximate to the first location in the commercial environment during playback of the advertisement, receive an indication of a purchase of the given product or the given service, the purchase associated with the user profile; and
   based on at least (i) determining that the user device has been detected proximate to the first location in the commercial environment during playback of the advertisement and (ii) the indication of the purchase of the given product or the given service, cause a content service account associated with the computing system to be updated.

2. The computing system of claim 1, wherein the program instructions that are executable by the at least one processor such that the computing system is configured to cause the content service account to be updated comprise program instructions that are executable by the at least one processor such that the computing system is configured to: cause the content service account associated with the computing system to be credited with the purchase of the given product or the given service.

3. The computing system of claim 1, wherein the indication that the user device is detected proximate to the first location comprises an indication of a location of the user device within the commercial environment.

4. The computing system of claim 3, wherein the location of the user device within the commercial environment comprises a network location associated with the user device.

5. The computing system of claim 1, wherein the computing system further comprises program instructions stored on the at least one non-transitory computer-readable medium that are executable by the at least one processor such that the computing system is configured to:
   predict an indication that the user device will move to a second location in the commercial environment.

6. The computing system of claim 5, wherein the computing system further comprises program instructions stored on the at least one non-transitory computer-readable medium that are executable by the at least one processor such that the computing system is configured to:
   based on at least (i) the user profile associated with the user device, and (ii) the indication that the user device will move to a second location in the commercial environment, determine the advertisement.

7. The computing system of claim 5, wherein the computing system further comprises program instructions stored on the at least one non-transitory computer-readable medium that are executable by the at least one processor such that the computing system is configured to:
   based on at least (i) the user profile associated with the user device, and (ii) the indication that the user device will move to a second location in the commercial environment, determine a future advertisement for playback if the user device is proximate to the second location.

8. The computing system of claim 1, wherein the computing system further comprises program instructions stored on the at least one non-transitory computer-readable medium that are executable by the at least one processor such that the computing system is configured to:
   determine one or more media items for playback; and
   cause one or more playback devices in the commercial environment to play back the one or more media items.

9. The computing system of claim 8, wherein the one or more media items includes a first media item and a second media item, and
   wherein the program instructions that are executable by the at least one processor such that the computing system is configured to cause the one or more playback devices located in the first location of the commercial environment to play back the advertisement comprise program instructions that are executable by the at least one processor such that the computing system is configured to:
   cause the one or more playback devices located in the first location of the commercial environment to play back the advertisement between the first media item and the second media item.

10. The computing system of claim 1, wherein the user device is installed with a commercial application associated with the commercial environment,
   wherein the user profile is a first user profile associated with the commercial application, and wherein the computing system further comprises program instructions stored on the at least one non-transitory computer-readable medium that are executable by the at least one processor such that the computing system is configured to:
determine a second user profile associated with the user device and the computing system, the second user profile associated with the user device; and
establish a link between the first user profile and the second user profile.

11. The computing system of claim 10, wherein the program instructions that are executable by the at least one processor such that the computing system is configured to cause the content service account to be updated is further based on the link between the first user profile and the second user profile.

12. The computing system of claim 10, wherein the computing system further comprises program instructions stored on the at least one non-transitory computer-readable medium that are executable by the at least one processor such that the computing system is configured to:
determine a first set of musical preferences associated with the commercial environment;
determine a second set of musical preferences associated with the second user profile; and
based on at least (i) the first set of musical preferences associated with the commercial environment, and (ii) the second set of musical preferences associated with the second user profile, determine one or more media items for playback.

13. At least one non-transitory computer-readable medium, wherein the at least one non-transitory computer-readable medium is provisioned with program instructions that, when executed by at least one processor, cause a computing system to:
cause one or more playback devices located in a first location of a commercial environment to play back an advertisement for a given product or a given service;
based on sensor data received from one or more sensors within the commercial environment, determine that a user device is detected proximate to the first location in the commercial environment during playback of the advertisement;
determine a user profile associated with the user device;
after determining that the user device has been detected proximate to the first location in the commercial environment during playback of the advertisement, receive an indication of a purchase of the given product or the given service, the purchase associated with the user profile; and
based on at least (i) the determining that the user device has been detected proximate to the first location in the commercial environment during play back of the advertisement and (ii) the indication of the purchase of the given product or the given service, cause a content service account associated with the computing system to be updated.

14. The at least one non-transitory computer-readable medium of claim 13, wherein the program instructions that, when executed by at least one processor, cause the computing system to cause the content service account to be updated comprise program instructions that, when executed by the at least one processor, cause the computing system to:
cause the content service account associated with the computing system to be credited with the purchase of the given product or the given service.

15. The at least one non-transitory computer-readable medium of claim 13, wherein the at least one non-transitory computer-readable medium is also provisioned with instructions that, when executed by the at least one processor, cause the computing system to:
predict an indication that the user device will move to a second location in the commercial environment.

16. The at least one non-transitory computer-readable medium of claim 15, wherein the at least one non-transitory computer-readable medium is also provisioned with instructions that, when executed by the at least one processor, cause the computing system to:
based on at least (i) the user profile associated with the user device and (ii) the indication that the user device will move to a second location in the commercial environment, determine the advertisement.

17. The at least one non-transitory computer-readable medium of claim 15, wherein the at least one non-transitory computer-readable medium is also provisioned with instructions that, when executed by the at least one processor, cause the computing system to:
based on at least (i) the user profile associated with the user device and (ii) the indication that the user device will move to a second location in the commercial environment, determine a future advertisement for playback if the user device is proximate to the second location.

18. A method carried out by a computing system, the method comprising:
causing one or more playback devices located in a first location of a commercial environment to play back an advertisement for a given product or a given service;
based on sensor data received from one or more sensors within the commercial environment, determining that a user device is detected proximate to the first location in the commercial environment during playback of the advertisement;
determining a user profile associated with the user device;
after determining that the user device has been detected proximate to the first location in the commercial environment during playback of the advertisement, receiving an indication of a purchase of the given product or the given service, the purchase associated with the user profile; and
based on at least (i) determining that the user device has been detected proximate to the first location in the commercial environment during playback of the advertisement and (ii) the indication of the purchase of the given product or the given service, causing a content service account associated with the computing system to be updated.

19. The method of claim 18, wherein causing the content service account to be updated comprises causing the content service account associated with the computing system to be credited with a purchase of the given product or the given service.

20. The method of claim 19, further comprising:
predicting an indication that the user device will move to a second location in the commercial environment; and
based on at least (i) the user profile associated with the user device and (ii) the indication that the user device will move to a second location in the commercial environment, determining the advertisement.

* * * * *